(12) United States Patent
Wang et al.

(10) Patent No.: US 12,292,636 B2
(45) Date of Patent: May 6, 2025

(54) DISPLAY PANEL, MANUFACTURING METHOD THEREFOR, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Xian Wang, Beijing (CN); Yong Zhang, Beijing (CN); Hongjun Yu, Beijing (CN); Longhu Hao, Beijing (CN); Ce Wang, Beijing (CN); Haoran Zhang, Beijing (CN); Yashuai An, Beijing (CN); Yang Ge, Beijing (CN); Lei Shi, Beijing (CN); Xingxing Guan, Beijing (CN); Jianwei Ma, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/617,639

(22) Filed: Mar. 26, 2024

(65) Prior Publication Data
US 2025/0076696 A1    Mar. 6, 2025

Related U.S. Application Data

(63) Continuation of application No. PCT/CN2023/116149, filed on Aug. 31, 2023.

(51) Int. Cl.
*G02F 1/1333*    (2006.01)
*G02F 1/1339*    (2006.01)

(52) U.S. Cl.
CPC .. *G02F 1/133345* (2013.01); *G02F 1/133388* (2021.01); *G02F 1/1339* (2013.01)

(58) Field of Classification Search
None
See application file for complete search history.

(56) References Cited

U.S. PATENT DOCUMENTS 6,219,126 B1 * 4/2001 Von Gutfeld ......... G02F 1/1339
                                                 349/190
7,292,304 B2 * 11/2007 Kim ....................... G02F 1/1339
                                                 349/187

(Continued)

FOREIGN PATENT DOCUMENTS

CN        101957511 A      1/2011
CN        102236208 A    11/2011

(Continued)

*Primary Examiner* — Ryan Crockett
(74) *Attorney, Agent, or Firm* — IPro, PLLC

(57) ABSTRACT

Embodiments of the present disclosure provide a display panel, a manufacturing method therefor, and a display apparatus. The display panel includes a first substrate and a second substrate which are aligned, liquid crystals are filled between the first substrate and the second substrate, the first substrate and the second substrate which are aligned have a display region and a peripheral region surrounding the display region, the peripheral region is provided with a frame sealing adhesive located between the first substrate and the second substrate and surrounding the display region, and the frame sealing adhesive is configured to seal the liquid crystals.

16 Claims, 16 Drawing Sheets

(56) References Cited

U.S. PATENT DOCUMENTS

| | | | | |
|---|---|---|---|---|
| 7,643,123 B2* | 1/2010 | Baek | | G02F 1/1339 349/154 |
| 2002/0044232 A1* | 4/2002 | Cho | | G02F 1/1339 349/190 |
| 2003/0117570 A1* | 6/2003 | Kim | | G02F 1/13394 349/153 |
| 2003/0179338 A1* | 9/2003 | Kim | | G02F 1/1341 349/153 |
| 2004/0160566 A1* | 8/2004 | Kawabe | | G02F 1/1341 349/153 |
| 2004/0252270 A1* | 12/2004 | Lee | | G02F 1/1341 349/153 |
| 2005/0219455 A1* | 10/2005 | Hsieh | | G02F 1/1339 349/153 |
| 2006/0017775 A1* | 1/2006 | Li | | G02F 1/133711 347/45 |
| 2006/0139558 A1* | 6/2006 | Huang | | G02F 1/1341 349/153 |
| 2007/0052908 A1* | 3/2007 | Jang | | G02F 1/1339 349/153 |
| 2008/0018848 A1* | 1/2008 | Iwato | | G02F 1/133711 349/149 |
| 2011/0013125 A1* | 1/2011 | Lee | | G02F 1/133711 156/182 |
| 2011/0013132 A1* | 1/2011 | Chen | | G02F 1/1339 349/190 |
| 2011/0222013 A1* | 9/2011 | Kawanishi | | G02F 1/1339 349/190 |
| 2012/0257152 A1* | 10/2012 | Moriwaki | | G02F 1/1339 349/123 |
| 2012/0300163 A1* | 11/2012 | Moriwaki | | G02F 1/1337 445/24 |
| 2013/0010250 A1* | 1/2013 | Kira | | G02F 1/1339 257/E33.053 |
| 2013/0222753 A1* | 8/2013 | Koito | | G02F 1/1339 264/1.7 |
| 2014/0063431 A1* | 3/2014 | Shih | | G02F 1/1337 349/153 |
| 2014/0104529 A1* | 4/2014 | Ikeda | | G02F 1/13394 349/43 |
| 2015/0062515 A1* | 3/2015 | Tomioka | | G02F 1/133345 349/123 |
| 2015/0160484 A1* | 6/2015 | Liu | | G02F 1/1339 445/24 |
| 2016/0093645 A1 | 3/2016 | Lee et al. | | |
| 2017/0146862 A1* | 5/2017 | Ma | | G02F 1/136209 |
| 2020/0303482 A1* | 9/2020 | Kishimoto | | G09F 9/30 |
| 2020/0310177 A1* | 10/2020 | Pan | | G02F 1/1341 |

FOREIGN PATENT DOCUMENTS

| | | |
|---|---|---|
| CN | 105954942 A | 9/2016 |
| CN | 106990622 A | 7/2017 |
| CN | 206601549 U | 10/2017 |
| CN | 107918232 A | 4/2018 |

* cited by examiner

DISPLAY PANEL, MANUFACTURING METHOD THEREFOR, AND DISPLAY APPARATUS

CROSS-REFERENCE TO RELATED APPLICATIONS

This application is a continuation of International Application No. PCT/CN2023/116149, filed on Aug. 31, 2023, which is hereby incorporated by reference in its entirety.

TECHNICAL FIELD

The present disclosure relates to the technical field of display, in particular to a display panel, a manufacturing method therefor, and a display apparatus.

BACKGROUND

Liquid crystal displays are common flat-panel displays currently, with thin film transistor liquid crystal displays being the dominant products among the liquid crystal displays.

A liquid crystal display panel is an important component of a liquid crystal display, and in the related art, a color filter substrate and a first substrate are aligned by an aligning process to form the liquid crystal display panel. In the specific aligning process, liquid crystals are usually dripped onto the first substrate, and the color filter substrate is coated with a frame sealing adhesive that has a fixing effect. Then, in vacuum aligning equipment, the first substrate and the color filter substrate are aligned to form the liquid crystal display panel, then a UV curing process is carried out to pre-cure the frame sealing adhesive, and then the liquid crystal display panel is fed into a heating oven to thermally cure the frame sealing adhesive.

SUMMARY

Embodiments of the present disclosure provide a display panel, a manufacturing method therefor, and a display apparatus. The specific solutions are as follows.

An embodiment of the present disclosure provides a display panel, including a first substrate and a second substrate which are aligned, liquid crystals are filled between the first substrate and the second substrate, the first substrate and the second substrate which are aligned have a display region and a peripheral region surrounding the display region, the peripheral region is provided with a frame sealing adhesive located between the first substrate and the second substrate and surrounding the display region, and the frame sealing adhesive is configured to seal the liquid crystals.

The peripheral region of the first substrate is provided with a blocking structure located between a region where the frame sealing adhesive is located and the display region and surrounding the display region, and the blocking structure is configured to block the liquid crystals from overflowing an outer side of the frame sealing adhesive away from the display region when the liquid crystals are dripped on the first substrate.

In one possible implementation, in the above-mentioned display panel provided by the embodiment of the present disclosure, one blocking structure is provided;

or, at least two blocking structures are provided, and the at least two blocking structures are spaced in a sleeving manner between the frame sealing adhesive and the display region.

In one possible implementation, in the above-mentioned display panel provided by the embodiment of the present disclosure, the blocking structure is a protruding structure where a surface of the first substrate corresponding to the peripheral region protrudes out of a surface corresponding to the display region.

In one possible implementation, in the above-mentioned display panel provided by the embodiment of the present disclosure, the first substrate includes a base substrate, and a plurality of film layers sequentially disposed in a stacked manner on one side of the base substrate facing the liquid crystals, wherein the peripheral region of the first substrate further includes a first organic insulating layer disposed on one side of any one of the plurality of film layers facing the liquid crystals, the first organic insulating layer is an internal film layer of the protruding structure, and the first organic insulating layer causes the surface of the first substrate corresponding to the peripheral region to protrude out of the surface corresponding to the display region.

In one possible implementation, in the above-mentioned display panel provided by the embodiment of the present disclosure, the first organic insulating layer is a closed structure disposed surrounding the display region.

In one possible implementation, in the above-mentioned display panel provided by the embodiment of the present disclosure, the first organic insulating layer is disposed surrounding the display region, the first organic insulating layer has long edges and short edges, and at least one opening disconnecting the first organic insulating layer is at least provided in the short edges.

In one possible implementation, in the above-mentioned display panel provided by the embodiment of the present disclosure, a plurality of openings disconnecting the first organic insulating layer are provided in each edge of the first organic insulating layer.

In one possible implementation, in the above-mentioned display panel provided by the embodiment of the present disclosure, the blocking structure is a closed groove where a surface of the first substrate corresponding to the peripheral region is concave into a surface corresponding to the display region.

In one possible implementation, in the above-mentioned display panel provided by the embodiment of the present disclosure, the first substrate includes a base substrate, and at least two inorganic insulating layers sequentially disposed in a stacked manner on one side of the base substrate facing the liquid crystals; and at least one of the at least two inorganic insulating layers has a closed through groove at a position where the closed groove is located.

In one possible implementation, in the above-mentioned display panel provided by the embodiment of the present disclosure, one closed groove is provided, and any one of the at least two inorganic insulating layers has a closed through groove at the position where the closed groove is located.

In one possible implementation, in the above-mentioned display panel provided by the embodiment of the present disclosure, one closed groove is provided, and each of the at least two inorganic insulating layers has a closed through groove at the position where the closed groove is located.

In one possible implementation, in the above-mentioned display panel provided by the embodiment of the present disclosure, at least two closed grooves are provided, and any one of the at least two inorganic insulating layers has closed through grooves corresponding to the closed grooves in a one-to-one correspondence manner.

In one possible implementation, in the above-mentioned display panel provided by the embodiment of the present disclosure, a quantity of the closed grooves is the same as a quantity of the inorganic insulating layers, and each inorganic insulating layer has a closed through groove corresponding to one of the closed grooves.

In one possible implementation, in the above-mentioned display panel provided by the embodiment of the present disclosure, the first substrate includes a base substrate, at least two inorganic insulating layers sequentially disposed in a stacked manner on one side of the base substrate facing the liquid crystals, and a second organic insulating layer disposed between two adjacent inorganic insulating layers; and at least the second organic insulating layer has a closed through groove at a position where the closed groove is located.

In one possible implementation, in the above-mentioned display panel provided by the embodiment of the present disclosure, at least one closed groove is provided, and the second organic insulating layer has a closed through groove corresponding to the closed groove in a one-to-one correspondence manner.

In one possible implementation, in the above-mentioned display panel provided by the embodiment of the present disclosure, at least two closed grooves are provided, one of the closed grooves is formed by providing the closed through groove in the second organic insulating layer, and other closed grooves are formed by providing closed through grooves in at least one of the at least two inorganic insulating layers.

In one possible implementation, in the above-mentioned display panel provided by the embodiment of the present disclosure, a quantity of the closed grooves is the same as a sum of quantities of the inorganic insulating layers and the second organic insulating layer, and the second organic insulating layer and each inorganic insulating layer respectively have a closed through groove corresponding to one of the closed grooves.

In one possible implementation, in the above-mentioned display panel provided by the embodiment of the present disclosure, at least two closed grooves are provided, each closed groove is formed by providing the closed through groove in the same insulating layer, and a distance between two adjacent blocking structures is greater than 2 μm; and at least two closed grooves are provided, each closed groove is formed by providing the closed through grooves in different insulating layers, and a distance between two adjacent blocking structures is greater than 5 μm.

In one possible implementation, in the above-mentioned display panel provided by the embodiment of the present disclosure, a distance between the blocking structure closest to the display region and the display region is 100 μm-300 μm, and a distance between the blocking structure closest to the frame sealing adhesive and the frame sealing adhesive is 200 μm-250 μm.

In one possible implementation, in the above-mentioned display panel provided by the embodiment of the present disclosure, the first substrate is an array substrate, and the second substrate is an opposite substrate.

Correspondingly, an embodiment of the present disclosure further provides a display apparatus, including any one display panel provided by the embodiment of the present disclosure.

Correspondingly, an embodiment of the present disclosure further provides a manufacturing method for a display panel, including:
    forming a second substrate;
    applying a frame sealing adhesive material surrounding a display region to a position of the second substrate corresponding to a peripheral region;
    forming a first substrate, wherein, corresponding to the peripheral region, the first substrate is provided with a blocking structure located between a region where a frame sealing adhesive is located and the display region, and surrounding the display region;
    dripping liquid crystals into the blocking structure of the first substrate, wherein the blocking structure is configured to block the liquid crystals from overflowing an outer side of a corresponding region of the frame sealing adhesive material away from the display region when the liquid crystals are dripped on the first substrate; and
    aligning the second substrate and the first substrate, and curing the frame sealing adhesive material to form the frame sealing adhesive configured to seal the liquid crystals.

DETAILED DESCRIPTION

Figure 1:
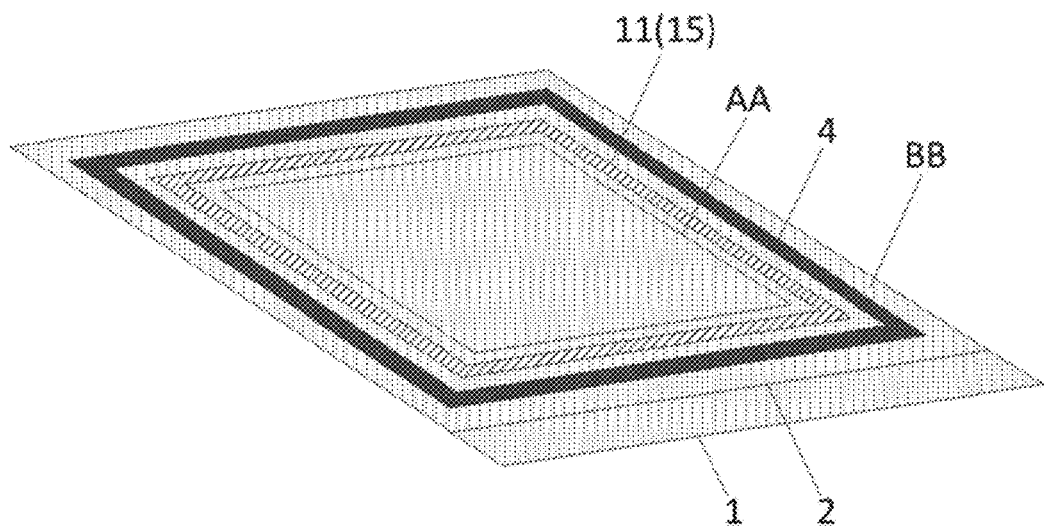
FIG. 1 is a schematic diagram of a plane structure of a display panel provided by an embodiment of the present disclosure.

In order to make the objectives, technical solutions and advantages of embodiments of the present disclosure clearer, the technical solutions of the embodiments of the present disclosure will be clearly and completely described below with reference to the accompanying drawings of the embodiments of the present disclosure. Apparently, the described embodiments are merely some embodiments of the present disclosure, rather than all of the embodiments. The embodiments in the present disclosure and features in the embodiments can be combined with each other in the case of not conflicting. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The word "comprise" or "include" and the like used in the present disclosure indicate that an element or item appearing before such word covers listed elements or items appearing after the word and equivalents thereof, and does not exclude other elements or items. The word "connect" or "couple" or the like is not limited to a physical or mechanical connection, but may include an electrical connection, whether direct or indirect. "Inner", "outer", "upper" and "lower" and the like are only used to represent relative position relationships, and the relative position relationships may also change accordingly after an absolute position of a described object is changed.

It needs to be noted that the sizes and shapes of all figures in the accompanying drawings do not reflect true scales, and are only intended to schematically illustrate the content of the present disclosure. The same or similar reference numerals represent the same or similar elements or elements with the same or similar functions throughout.

With the continuous development of a liquid crystal display technology, requirements of users on the performance of liquid crystal displays are increasingly high, and the users also have requirements on the sizes of the liquid crystal displays, especially, small or even ultra-small liquid crystal displays are more and more sought after by users in recent years as they are convenient to carry. However, for small liquid crystal displays (e.g., sizes of 0.4 inch to 0.8 inch), there is a problem of poor liquid crystal diffusion (NG) due to the use of a liquid crystal dripping process. For example, the quantity of panels (for example, size of 0.42 inch) on a glass substrate (size of 1300*1100) of Generation 5 line is more than 10,000 pieces, liquid crystals are generally dripped on a first substrate, a frame sealing adhesive is generally applied to a color filter substrate, and then aligning is performed. Since the minimum dripping amount of the liquid crystals has certain requirements, due to the limitation of the size of the panels, diffusion of the liquid crystals dripped firstly has exceeded the width of a corresponding region of the frame sealing adhesive after the liquid crystals are dripped on all the panels, so the color filter substrate and the first substrate cannot be successfully aligned during aligning because the liquid crystals diffuse to the outer side of the corresponding region of the frame sealing adhesive.

In view of the above, in order to solve the problem that for small liquid crystal displays, aligning cannot be successfully performed due to the fact that liquid crystals diffuse to the outer side of the corresponding region of the frame sealing adhesive during liquid crystal dripping, an embodiment of the present disclosure provides a display panel. As shown in FIG. 1-FIG. 10, FIG. 1-FIG. 3, FIG. 5, and FIG. 7 are schematic diagrams of plane structures of several display panels provided by embodiments of the present disclosure respectively, FIG. 4 is a schematic diagram of a cross-sectional structure corresponding to the display panel shown in FIG. 1-FIG. 3, FIG. 6 is a schematic diagram of a cross-sectional structure corresponding to the display panel shown in FIG. 5, and FIG. 8-FIG. 10 are schematic diagrams of several cross-sectional structures corresponding to the display panel shown in FIG. 7 respectively. The display panel includes a first substrate 1 and a second substrate 2 which are aligned, liquid crystals 3 are filled between the first substrate 1 and the second substrate 2, the first substrate 1 and the second substrate 2 which are aligned have a display region AA and a peripheral region BB surrounding the display region AA, the peripheral region BB is provided with a frame sealing adhesive 4 located between the first substrate 1 and the second substrate 2 and surrounding the display region AA, and the frame sealing adhesive 4 is configured to seal the liquid crystals 3.

The peripheral region BB of the first substrate 1 is provided with a blocking structure 11 located between a region where the frame sealing adhesive 4 is located and the display region AA and surrounding the display region AA, and the blocking structure 11 is configured to block the liquid crystals 3 from overflowing an outer side of the frame sealing adhesive 4 away from the display region AA when the liquid crystals 3 are dripped on the first substrate 1.

In the above-mentioned display panel provided by the embodiment of the present disclosure, the peripheral region of the first substrate is provided with the blocking structure located between the frame sealing adhesive and the display region and surrounding the display region, so that when the liquid crystals are dripped on the first substrate, the blocking structure prevents the liquid crystals from diffusing to the region where the frame sealing adhesive is located, and thereby prevents the liquid crystals from overflowing the outer side of the frame sealing adhesive away from the display region, i.e., prevents the liquid crystals from crossing over the region where the frame sealing adhesive is located. Therefore, the present disclosure can avoid the problem that the first substrate and the second substrate cannot be aligned successfully due to the fact that the liquid crystals diffuse to the outer side of the corresponding region of the frame sealing adhesive during the liquid crystal dripping.

Optionally, the first substrate in the embodiment of the present disclosure may be an array substrate, and the second substrate may be an opposite substrate, for example, the opposite substrate is a color filter (CF) substrate with a color filter and a black matrix. Before the first substrate and the second substrate are aligned, applying the frame sealing adhesive to the peripheral region of the second substrate (color filter substrate), and dripping the liquid crystals into the display region of the first substrate (array substrate) are taken as an example.

Of course, the first substrate in the embodiment of the present disclosure may be a color filter substrate with the color filter and the black matrix, and the second substrate may be the array substrate. Before the first substrate and the second substrate are aligned, the frame sealing adhesive is applied to the peripheral region of the second substrate (array substrate), and the liquid crystals are dripped into the display region of the first substrate (color filter substrate).

The embodiment of the present disclosure is based on the example of the first substrate as the array substrate, the second substrate as the color filter substrate, and applying the frame sealing adhesive to the peripheral region of the second substrate and dripping the liquid crystals into the display region of the first substrate before the first substrate and the second substrate are aligned.

Specifically, before the first substrate and the second substrate are aligned, the structure of the frame sealing adhesive in the embodiment of the present disclosure is a ring of annular structure provided on the second substrate. Specifically, the frame sealing adhesive is internally provided with silicon balls as a support, to achieve an effective support between the first substrate and the second substrate. Optionally, a diameter of each silicon ball is in the range of 3 µm to 5 µm, and a width of the frame sealing adhesive is generally about 800 am.

In specific implementation, in the above-mentioned display panel provided by the embodiments of the present disclosure, as shown in FIG. 1-FIG. 6, one blocking structure 11 may be provided, i.e., a ring of blocking structure 11 is provided surrounding the display region AA at a certain distance from the display region AA, so that when dripping the liquid crystals on the first substrate 1, it can be avoided that the excess liquid crystals 3 flow into the region where the frame sealing adhesive 4 is located. As shown in FIG. 7-FIG. 10, at least two blocking structures 11 are provided (in the case of two), and the at least two blocking structures 11 are spaced in a sleeving manner between the frame sealing adhesive 4 and the display region AA, so that the at least two blocking structures 11 can increase the capacity of blocking the liquid crystals 3, further avoiding the excess liquid crystals 3 flowing to the region where the frame sealing adhesive 4 is located.

Figure 6:
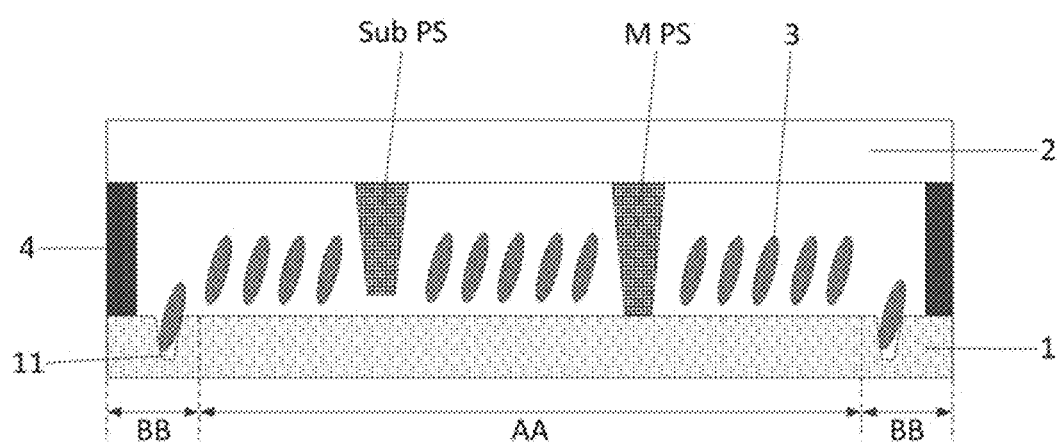
FIG. 6 is a schematic diagram of a cross-sectional structure corresponding to the display panel shown in FIG. 5.
Figure 7:
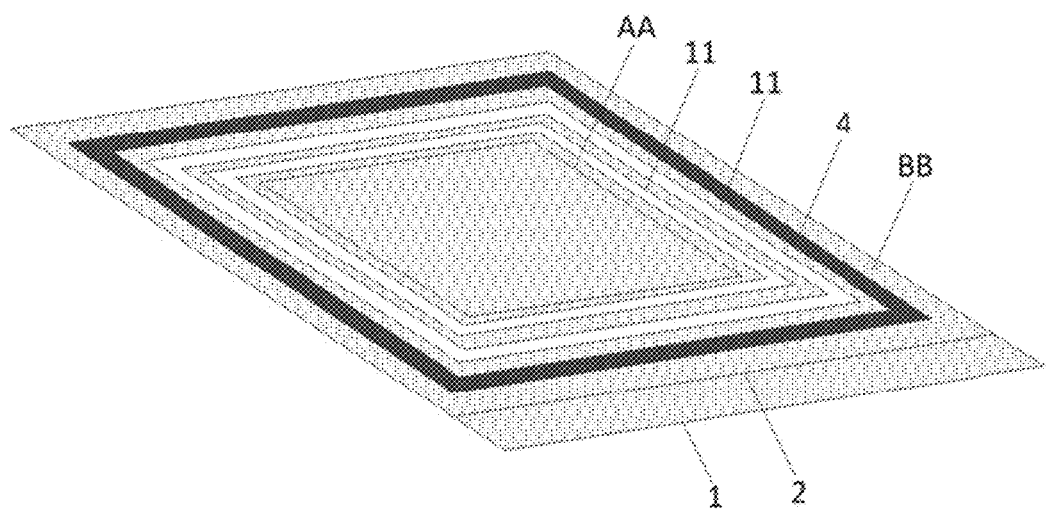
FIG. 7 is a schematic diagram of a plane structure of another display panel provided by an embodiment of the present disclosure.
Figure 8:
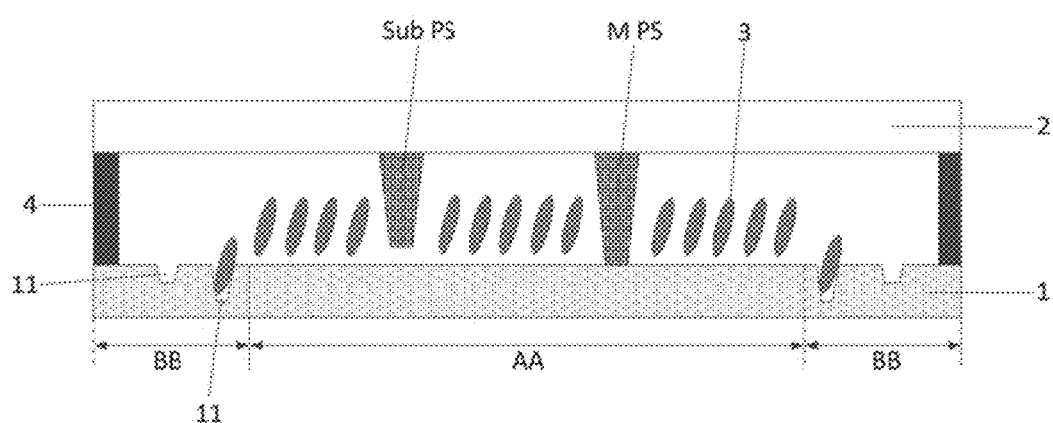
FIG. 8 is a schematic diagram of a cross-sectional structure corresponding to the display panel shown in FIG. 7.
Figure 9:
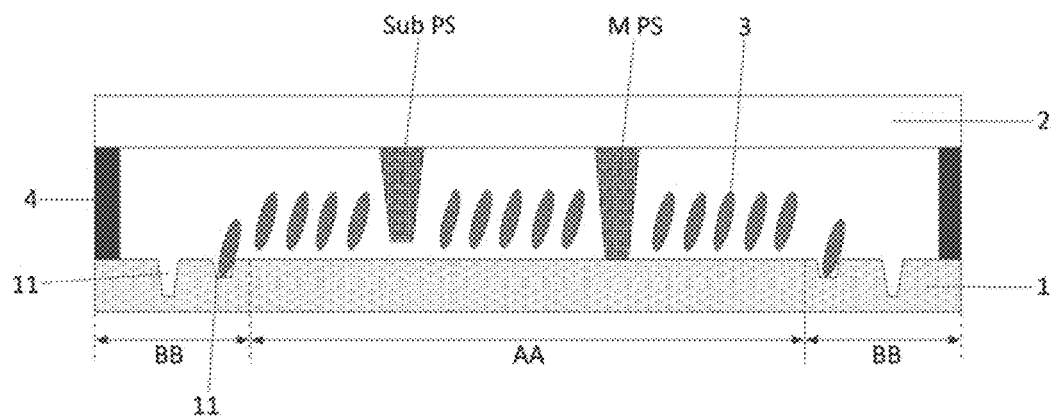
FIG. 9 is a schematic diagram of another cross-sectional structure corresponding to the display panel shown in FIG. 7.
Figure 10:
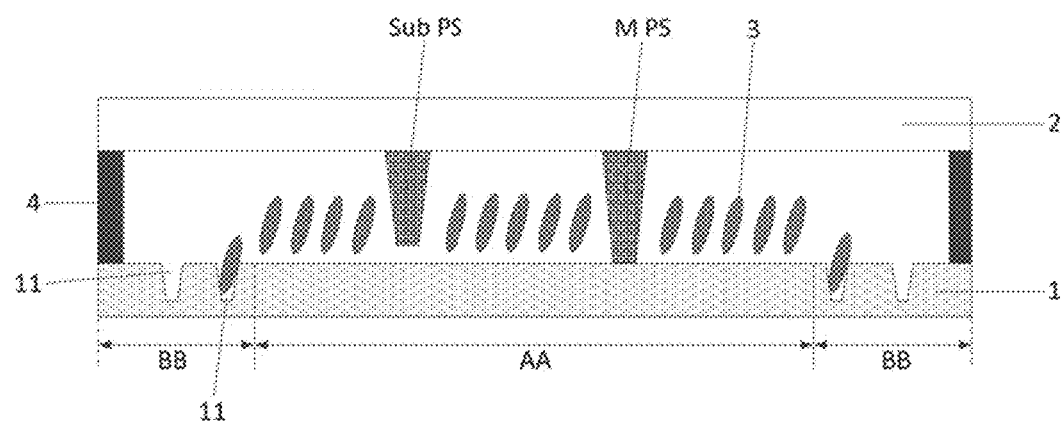
FIG. 10 is a schematic diagram of yet another cross-sectional structure corresponding to the display panel shown in FIG. 7.
Figure 15:
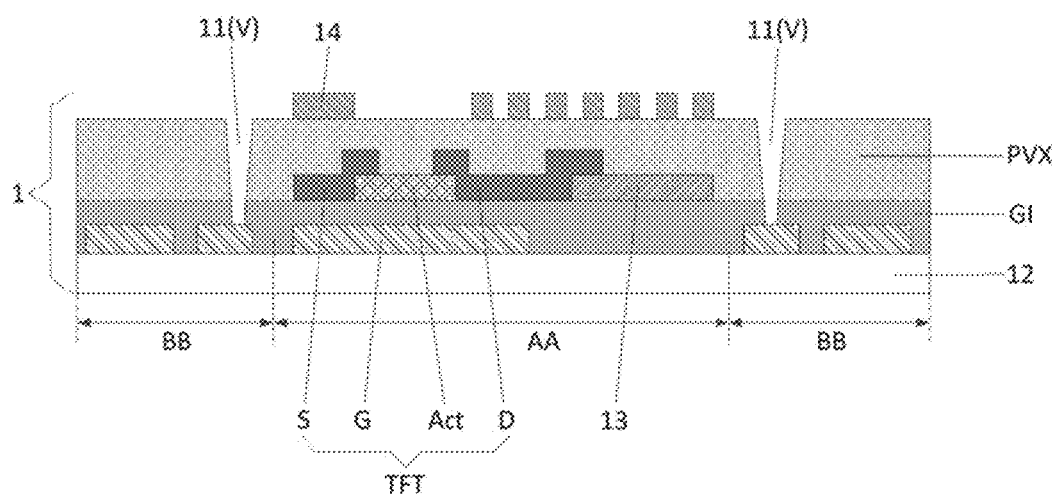
FIG. 15 is a schematic diagram of another specific structure of a first substrate shown in FIG. 6.
Figure 16:
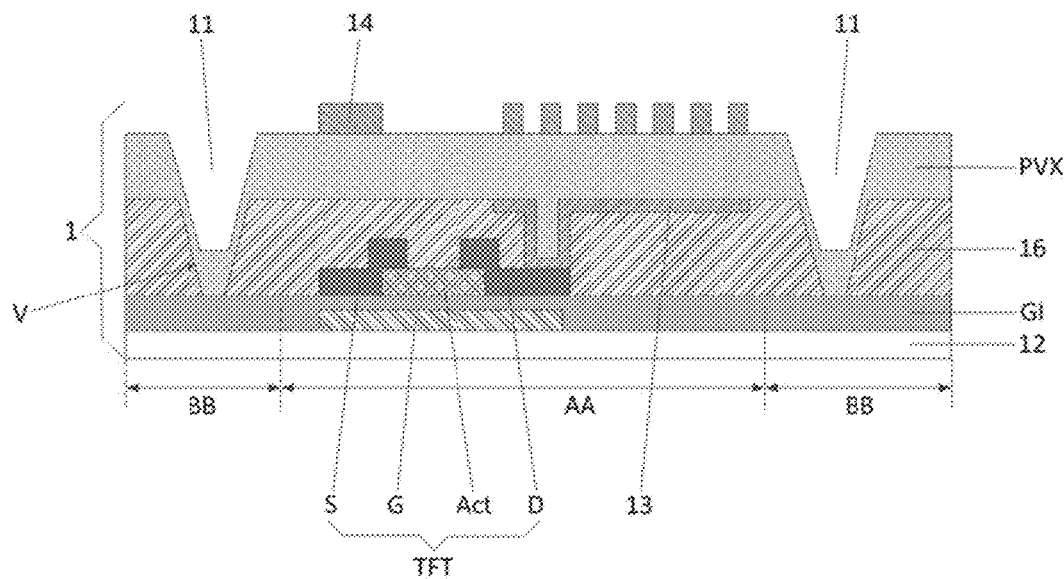
FIG. 16 is a schematic diagram of yet another specific structure of a first substrate shown in FIG. 6.
Figure 17:
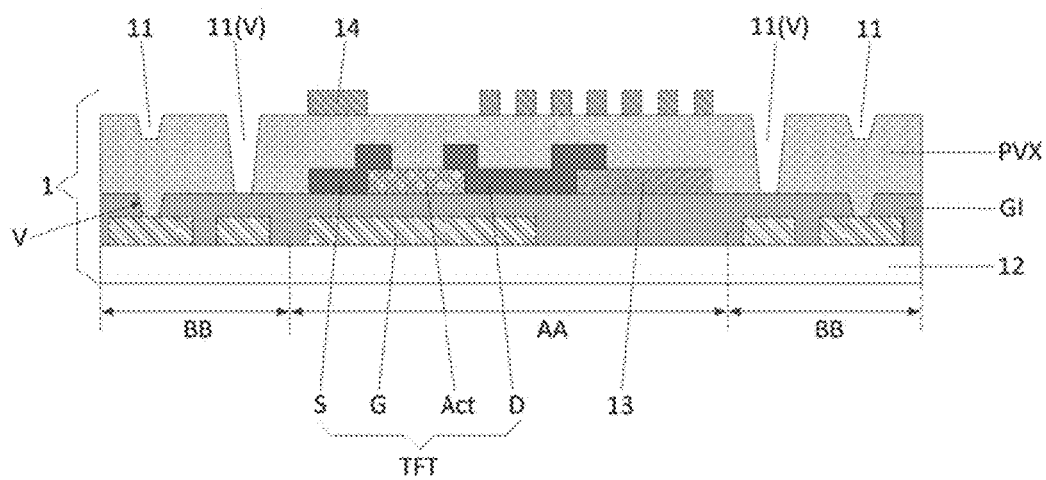
FIG. 17 is a schematic diagram of a specific structure of a first substrate shown in FIG. 8.
Figure 18:
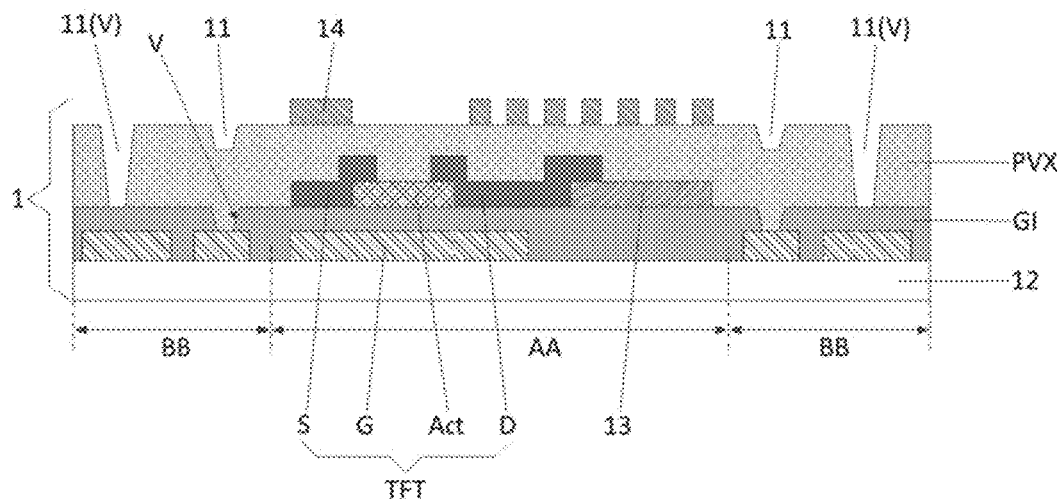
FIG. 18 is a schematic diagram of another specific structure of a first substrate shown in FIG. 9.
Figure 19:
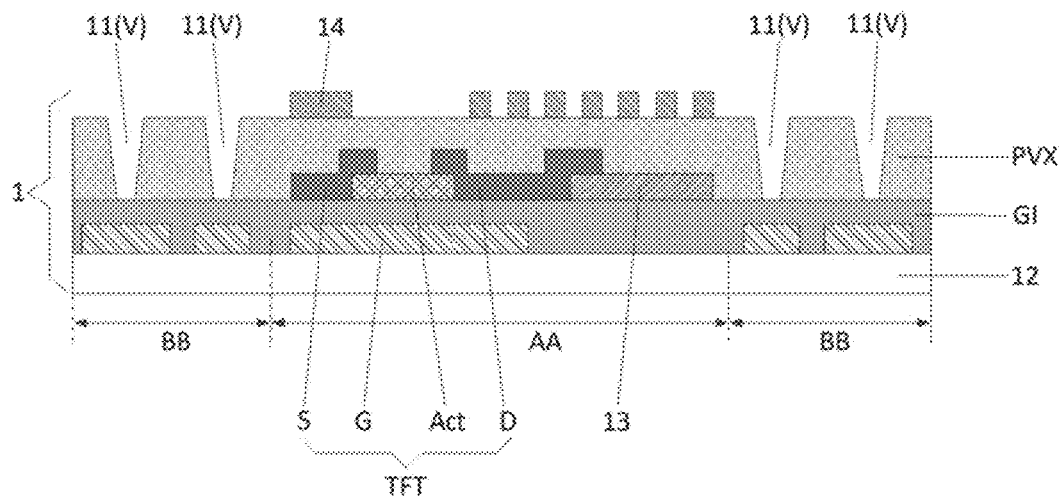
FIG. 19 is a schematic diagram of a specific structure of a first substrate shown in FIG. 10.
Figure 20:
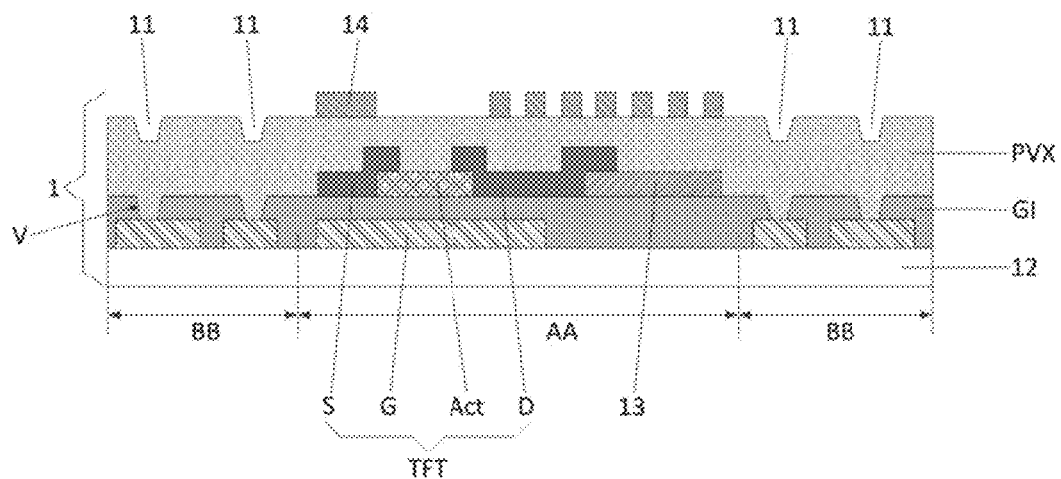
FIG. 20 is a schematic diagram of another specific structure of a first substrate shown in FIG. 10.

In specific implementation, in the above-mentioned display panel provided by the embodiments of the present disclosure, as shown in FIG. 11-FIG. 20, FIG. 11 and FIG. 12 are schematic diagrams of two specific structures of the first substrate 1 in FIG. 4, FIG. 13-FIG. 16 are schematic diagrams of four specific structures of the first substrate 1 in FIG. 6, FIG. 17 is a schematic diagram of a specific structure of the first substrate 1 in FIG. 8, FIG. 18 is a schematic diagram of a specific structure of the first substrate 1 in FIG. 9, and FIG. 19 and FIG. 20 are schematic diagrams of two specific structures of the first substrate 1 in FIG. 10 respectively. The first substrate 1 includes a base substrate 12, the display region AA corresponding to the base substrate 12 is divided into a plurality of pixel units arranged in array. FIG. 11-FIG. 20 illustrate a cross-sectional schematic diagram of only one of the pixel units. Each pixel unit of the first substrate 1 includes a pixel circuit disposed on a side of the base substrate 12 facing the liquid crystals 3 and a pixel electrode 13 correspondingly and electrically connected to the pixel circuit. The first substrate 1 further includes a common electrode 14 disposed on one sides of the pixel circuit and the pixel electrode 13 facing the liquid crystals 3, wherein the pixel circuit includes a thin film transistor (TFT), the TFT includes a gate G, an active layer Act, a source S, and a drain D, the drain D of the TFT is electrically connected to the corresponding pixel electrode 13, the gate G of the TFT is connected to a gate line (not shown), and the source S of the TFT is electrically connected to a data line (not shown). The gate lines may be provided in correspondence with pixel rows, and the gates of the TFTs of the pixel units in the same pixel row are connected to the same gate line. The data lines may be provided in correspondence with pixel rows, optionally, the sources of the TFTs of the pixel units in the same pixel row are connected to the same data line. Optionally, the pixel electrode 13 and the common electrode 14 are transparent conducting layers, such as ITO layers.

Specifically, as shown in FIG. 11 to FIG. 20, the first substrate 1 further includes: a gate insulating layer GI disposed between the gate G and the active layer Act, and a passivation layer PVX disposed among the source S, the drain D, and the common electrode 14.

Figure 11:
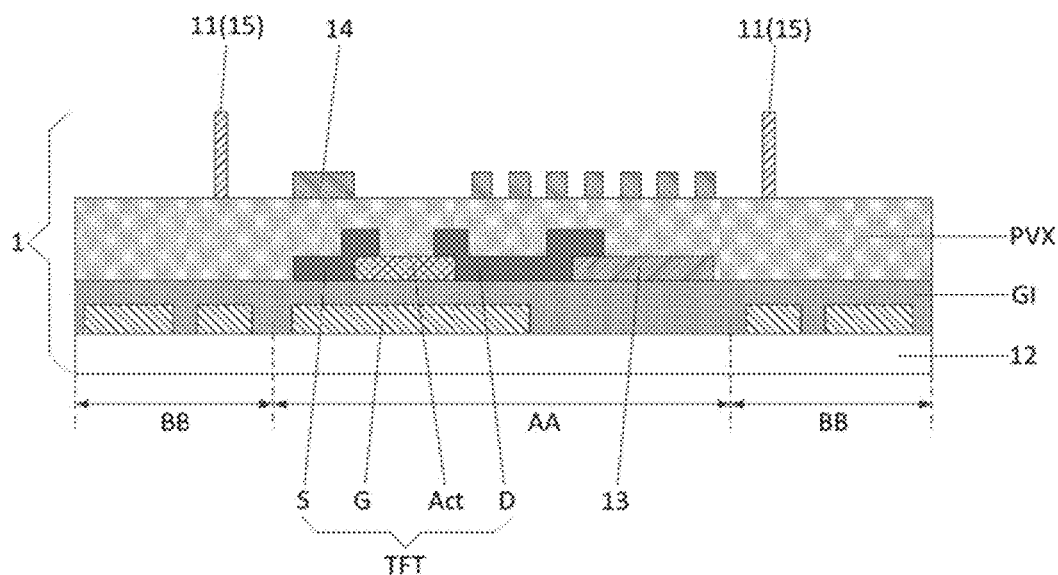
FIG. 11 is a schematic diagram of a specific structure of a first substrate shown in FIG. 4.
Figure 12:
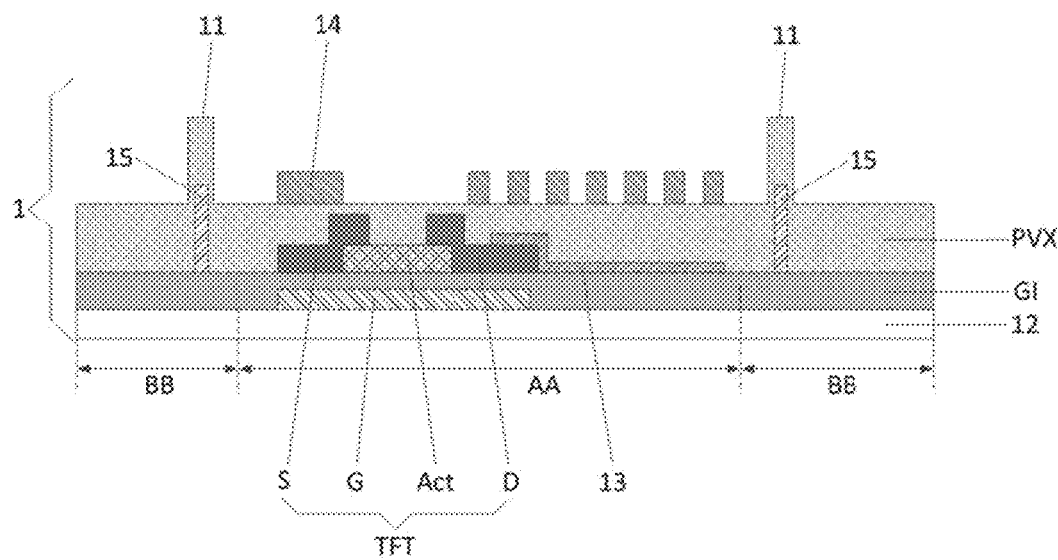
FIG. 12 is a schematic diagram of another specific structure of a first substrate shown in FIG. 4.
Figure 14:
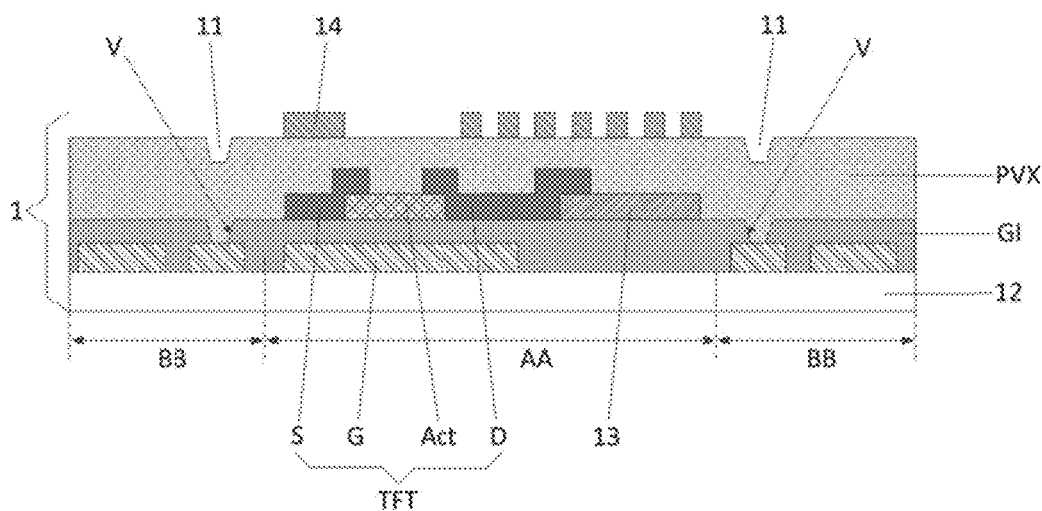
FIG. 14 is a schematic diagram of another specific structure of a first substrate shown in FIG. 6.

Optionally, as shown in FIG. 11 to FIG. 20, the embodiments of the present disclosure are based on the example that the source S and the drain D are disposed on the active layer Act and are in direct contact with and electrically connected to the active layer Act. As shown in FIG. 11, FIG. 13, FIG. 14, FIG. 15, and FIG. 17 to FIG. 20, the embodiments of the present disclosure are based on the example that the pixel electrode 13 is disposed below the drain D and the drain D is in direct contact with and electrically connected to the pixel electrode 13. As shown in FIG. 12, the embodiment of the present disclosure is based on the example that the pixel electrode 13 is disposed on the drain D and the drain D is in direct contact with and electrically connected to the pixel electrode 13. As shown in FIG. 16, the embodiment of the present disclosure is based on the example that the pixel electrode 13 is disposed on the drain D and the drain D is electrically connected to the pixel electrode 13 through a via hole. Of course, the embodiments are not limited thereto, for example, connection manners of TFT structures and the pixel electrode 13 in the embodiments of the present disclosure are applicable to all connection manners of TFT structures and the pixel electrode 13 in the related art.

In specific implementation, in the above-mentioned display panel provided by the embodiments of the present disclosure, as shown in FIG. 1-FIG. 4, FIG. 11 and FIG. 12, the blocking structure 11 may be a protruding structure where a surface of the first substrate 1 corresponding to the peripheral region BB protrudes out of a surface corresponding to the display region AA. In this way, when dripping the liquid crystals on the first substrate 1, the protruding structure can limit the flow range of the liquid crystals 3, preventing the liquid crystals 3 from diffusing to the outer side of the region where the frame sealing adhesive 4 is located to affect the aligning, and thus avoiding unsuccessful aligning when the first substrate 1 and the second substrate 2 are aligned.

Optionally, a height of the blocking structure 11 may be made up to a maximum of 2.5 µm to 4 µm, and the height of the blocking structure 11 may be specifically adjusted according to the size of the display panel and the dripping amount of the liquid crystals. If the size of the display panel is small and the liquid crystals still diffuse to the outer side of the frame sealing adhesive 4 when the dripping amount of the liquid crystals is the smallest, a higher blocking structure 11 is required. On the contrary, if the size of the display panel is large and the amount of the liquid crystals diffusing to the outer side of the frame sealing adhesive 4 during the liquid crystal dripping is small, then the blocking structure 11 with a certain height is required.

In specific implementation, in the above-mentioned display panel provided by the embodiments of the present disclosure, as shown in FIG. 11 and FIG. 12, the first substrate 1 includes a base substrate 12, and a plurality of film layers (for example, a film layer where the above-mentioned gate G is located, the gate insulating layer GI, the active layer Act, a film layer where the pixel electrode 13 is located, a film layer where the source S and the drain D are located, the passivation layer PVX, and a film layer where the common electrode 14 is located) sequentially disposed in a stacked manner on one side of the base substrate 12 facing the liquid crystals 3.

Here, the peripheral region BB of the first substrate 1 further includes a first organic insulating layer 15 disposed on one side of any one of the plurality of film layers facing the liquid crystals 3, the first organic insulating layer 15 is an internal film layer of the protruding structure, and the first organic insulating layer 15 causes the surface of the first substrate 1 corresponding to the peripheral region BB to protrude out of the surface corresponding to the display region AA.

Optionally, as shown in FIG. 11, the first organic insulating layer 15 may be made after the common electrode 14 is made. Specifically, a whole layer of resin material may be applied to the side of the common electrode 14 facing the liquid crystals 3, and then the whole layer of resin material is patterned by a photolithographic process to remove the resin material of the display region AA, so as to form the first organic insulating layer 15 located between the region where the frame sealing adhesive 4 is located and the display region AA on the peripheral region BB, the first organic insulating layer 15 being the protruding structure. According to the present disclosure, the blocking structure 11 is made on the side of the common electrode 14 facing the liquid crystals 3 by using the resin material, so that only one mask needs to be added without changing other structures of the first substrate 1, and the fabrication process is simple.

Optionally, as shown in FIG. 12, the first organic insulating layer 15 may be made after the source S and the drain D are made but before the pixel electrode 13 is made. Specifically, a whole layer of resin material may be applied to one sides of the source S and the drain D facing the liquid crystals 3, and then the whole layer of resin material is patterned by a photolithographic process to remove the resin material of the display region AA, so as to form the first organic insulating layer 15 located between the region where the frame sealing adhesive 4 is located and the display region AA on the peripheral region BB, and then the pixel electrode 13, the passivation layer PVX and the common electrode 14 are sequentially made, so that the passivation layer PVX forms the protruding structure on the first organic insulating layer 15, i.e. the first organic insulating layer 15 is the internal film layer of the protruding structure formed by the passivation layer PVX. According to the present disclosure, the blocking structure 11 is made by using the resin material before the source S, the drain D and the pixel electrode 13 are made, so that only one mask needs to be added without changing other structures of the first substrate 1, and the fabrication process is also simple.

In specific implementation, in the above-mentioned display panel provided by the embodiments of the present disclosure, as shown in FIG. 1, FIG. 11 and FIG. 12, the first organic insulating layer 15 may be a closed structure disposed surrounding the display region AA, so that the blocking structure 11 is a fully closed structure disposed surrounding the display region AA.

Figure 2:
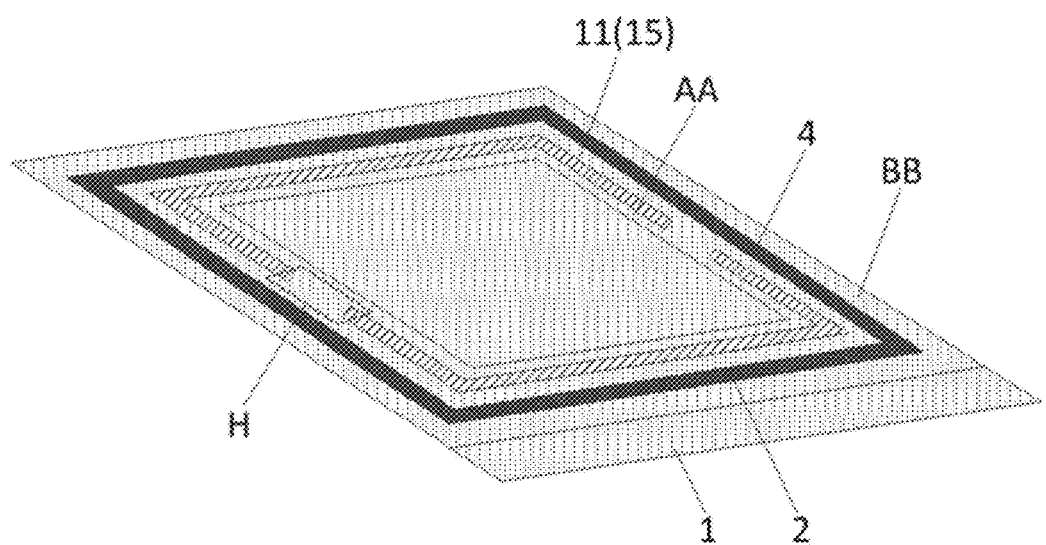
FIG. 2 is a schematic diagram of a plane structure of another display panel provided by an embodiment of the present disclosure.

In specific implementation, the fully closed annular blocking structure 11 shown in FIG. 1 will block flowing of the liquid crystals, causing the poor problems of not fill and bubble, in order to avoid the problems, in the above-mentioned display panel provided by the embodiments of the present disclosure, as shown in FIG. 2, FIG. 11 and FIG. 12, the first organic insulating layer 15 is disposed surrounding the display region AA, the first organic insulating layer 15 has long edges and short edges, and at least one opening H disconnecting the first organic insulating layer 15 is at least provided in the short edges, so that the blocking structure 11 has at least one opening H at least provided in the short edges. In this way, by reasonably controlling the size of the opening H, the liquid crystals flow sufficiently to fill the display region AA, and it can be ensured that the amount of the liquid crystals flowing out of the blocking structure 11 from the opening H will have no effect on the aligning process.

Figure 3:
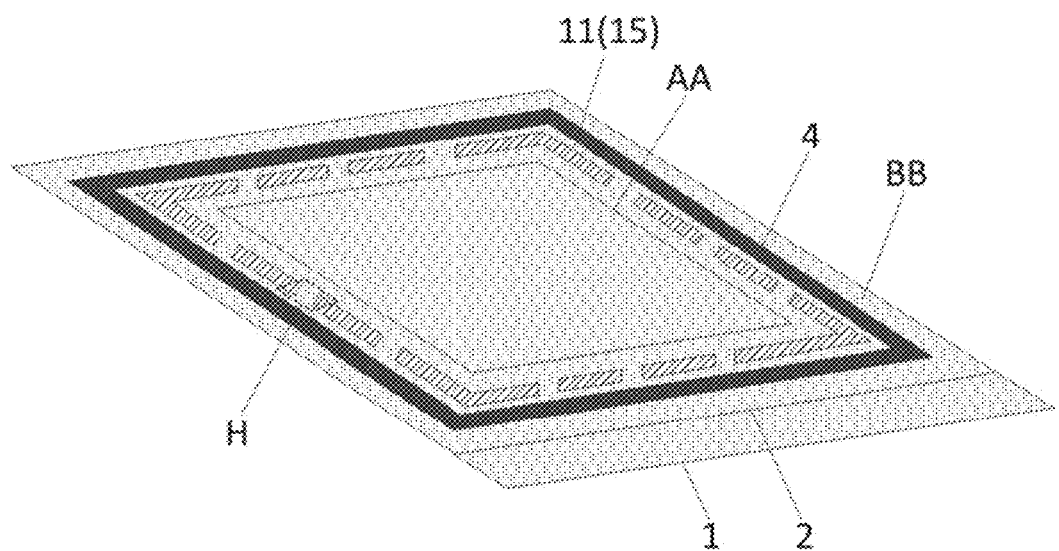
FIG. 3 is a schematic diagram of a plane structure of yet another display panel provided by an embodiment of the present disclosure.
Figure 4:
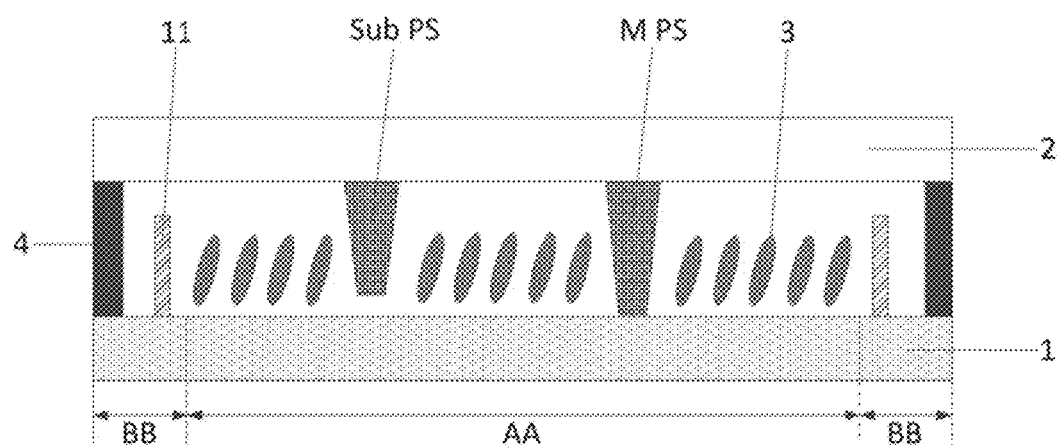
FIG. 4 is a schematic diagram of a cross-sectional structure corresponding to the display panel shown in FIG. 1-FIG. 3.
Figure 5:
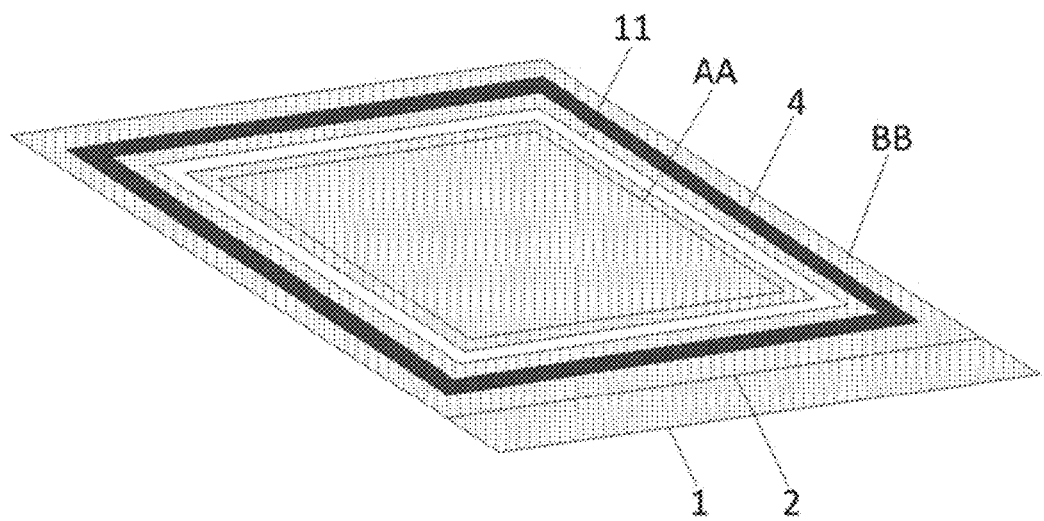
FIG. 5 is a schematic diagram of a plane structure of yet another display panel provided by an embodiment of the present disclosure.

In specific implementation, in order to further make the liquid crystals flow more uniform, in the above-mentioned display panel provided by the embodiments of the present disclosure, as shown in FIG. 3, FIG. 11, and FIG. 12, each edge of the first organic insulating layer 15 has a plurality of openings H disconnecting the first organic insulating layer 15, so that each edge of the blocking structure 11 has a plurality of openings H spaced apart, and the openings H spaced apart may make the liquid crystals flow more uniform. Optionally, the sizes of the openings H may be adjusted according to the sizes of upper, lower, left and right borders of the display region AA, for example, the blocking structure 11 corresponding to one side with a smaller border may have fewer openings or no opening, and the blocking structure 11 corresponding to one side with a larger border may have more openings or large openings.

It should be noted that the blocking structure 11 shown in FIG. 2 and FIG. 3 is provided with the openings H, so that the liquid crystals will flow through the openings H toward the frame sealing adhesive 4, and due to the blocking effect of the blocking structure 11, the liquid crystals will not be allowed to cross over the frame sealing adhesive 4 and affect the aligning even if the openings H are provided.

In specific implementation, in the above-mentioned display panel provided by the embodiments of the present disclosure, as shown in FIG. 5 to FIG. 10 and FIG. 13 to FIG. 20, the blocking structure 11 is a closed groove where a surface of the first substrate 1 corresponding to the peripheral region BB protrudes out of a surface corresponding to the display region AA. By providing the closed groove surrounding the display region AA at a certain distance from the display region AA, when the liquid crystals 3 are dripped onto the first substrate 1, the excess liquid crystals 3 can be allowed to flow into the groove, so that the excess liquid crystals 3 can be prevented from flowing to the outer side of the region where the frame sealing adhesive 4 is located. Moreover, since the groove is at a certain distance from the display region AA, the groove will not affect the orientation of the liquid crystals in the display region AA.

In specific implementation, in the above-mentioned display panel provided by the embodiments of the present disclosure, as shown in FIG. 13 to FIG. 15 and FIG. 17 to FIG. 20, the first substrate 1 includes a base substrate 12, and at least two inorganic insulating layers (for example, the above-mentioned gate insulating layer GI and passivation layer PVX) sequentially disposed in a stacked manner on one side of the base substrate 12 facing the liquid crystals 3.

At least one of the at least two inorganic insulating layers (the gate insulating layer GI and the passivation layer PVX) has a closed through groove V at a position where the closed groove is located. In this way, it is only necessary to use the original mask to make the corresponding closed through groove V in the corresponding inorganic insulating layer when making the gate insulating layer GI and the passivation layer PVX, so that the first substrate 1 forms the corresponding closed groove (i.e., the blocking structure 11) at the position of the closed through groove V. Therefore, the present disclosure does not need to add the mask for making the closed groove individually, and thus the complexity of the fabrication process is not increased.

In specific implementation, in the above-mentioned display panel provided by the embodiments of the present disclosure, at least one closed through groove V may be formed by using the gate insulating layer GI or the passivation layer PVX alone, a thickness of the passivation layer PVX generally ranges from 0.25 μm to 0.6 μm, so a thickness of the closed groove is 0.25 am to 0.6 μm, and a thickness of the gate insulating layer GI is generally 0.35 am to 0.4 μm, so the thickness of the closed groove is 0.35 am to 0.4 μm; or the gate insulating layer GI and the passivation layer PVX are combined to form inner and outer closed through grooves V, so that the thickness of one of the closed through grooves is 0.25 am to 0.6 μm, and the thickness of the other closed through groove is 0.35 μm to 0.4 μm; or the gate insulating layer GI and the passivation layer PVX are combined to form stacked closed through grooves V with orthographic projections overlapping, so that depths of the closed through grooves can be increased to 0.6-1 μm.

Figure 13:
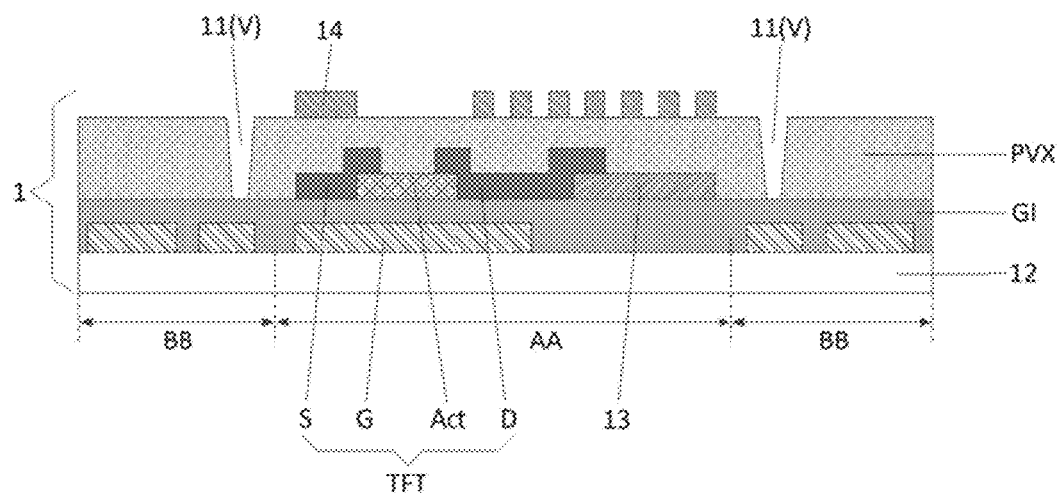
FIG. 13 is a schematic diagram of a specific structure of a first substrate shown in FIG. 6.

In specific implementation, in the above-mentioned display panel provided by the embodiments of the present disclosure, as shown in FIG. 13, FIG. 13 is a schematic cross-sectional diagram where a closed through groove V is formed in the passivation layer PVX alone, one closed groove (i.e., the blocking structure 11) is provided, and any one (e.g., the passivation layer PVX) of the at least two inorganic insulating layers (the gate insulating layer GI and the passivation layer PVX) has the closed through groove V at the position where the closed groove (i.e., the blocking structure 11) is located, i.e., the closed through groove V formed in the passivation layer PVX is the blocking structure 11. As shown in FIG. 14, FIG. 14 is a schematic cross-sectional diagram where a closed through groove V is formed in the gate insulating layer GI alone, one closed groove (i.e., the blocking structure 11) is provided, and any one (e.g., the gate insulating layer GI) of the at least two inorganic insulating layers (the gate insulating layer GI and the passivation layer PVX) has the closed through groove V at the position where the closed groove (i.e., the blocking structure 11) is located, i.e., the passivation layer PVX forms the closed groove (i.e., the blocking structure 11) at the closed through groove V when the passivation layer PVX is made.

In specific implementation, in the above-mentioned display panel provided by the embodiments of the present disclosure, as shown in FIG. 15, FIG. 15 is a schematic cross-sectional diagram where closed through grooves V with orthographic projections overlapping are formed in the gate insulating layer GI and the passivation layer PVX, one closed groove (i.e., the blocking structure 11) is provided, and each of the at least two inorganic insulating layers (the gate insulating layer GI and the passivation layer PVX) has the closed through groove V at the position where the closed groove (i.e., the blocking structure 11) is located, so that the stacked closed through grooves V with orthographic projections overlapping are formed in the gate insulating layer GI and the passivation layer PVX, the depth of the finally formed closed groove (i.e., the blocking structure 11) is a sum of the thicknesses of the gate insulating layer GI and the passivation layer PVX, and thus the amount of the liquid crystals of the closed groove can be increased, further avoiding the excess liquid crystals overflowing the outer side of the region where the frame sealing adhesive 4 is located.

In specific implementation, in the above-mentioned display panel provided by the embodiments of the present disclosure, as shown in FIG. 17 and FIG. 18, the quantity of closed grooves (i.e., the blocking structures 11) is the same as the quantity of the inorganic insulating layers (the gate insulating layer GI and the passivation layer PVX), i.e., two closed grooves (i.e., the blocking structures 11) are provided, and each inorganic insulating layer has a closed through groove V corresponding to one of the closed grooves (i.e., the blocking structures 11). Specifically, in the structures shown in FIG. 17 and FIG. 18, the passivation layer PVX and the gate insulating layer GI each have one closed through groove V formed therein, and the closed through groove V formed in the passivation layer PVX in FIG. 17 is closer to the display region AA, and the closed through groove V formed in the gate insulating layer GI in FIG. 18 is closer to the display region AA, so that the inner and outer double grooves are formed by using the passivation layer PVX and the gate insulating layer GI, increasing the amount of the liquid crystals of the grooves, and diffusing the excess liquid crystals into the grooves for storage to prevent overflowing.

In specific implementation, in the above-mentioned display panel provided by the embodiments of the present disclosure, as shown in FIG. 19 and FIG. 20, at least two closed grooves (i.e., the blocking structures 11) are provided, and any one of the at least two inorganic insulating layers (the passivation layer PVX and the gate insulating layer GI) has closed through grooves V corresponding to the closed grooves (i.e., the blocking structures 11) in a one-to-one correspondence manner. Specifically, as shown in FIG. 19, the passivation layer PVX has the closed through grooves V corresponding to the closed grooves (i.e., the blocking structures 11) in a one-to-one correspondence manner, and as shown in FIG. 20, the gate insulating layer GI has the closed through grooves V corresponding to the closed grooves (i.e., the blocking structures 11) in a one-to-one correspondence manner, i.e., the inner and outer double grooves are formed by using the same inorganic insulating layer, increasing the amount of the liquid crystals of the grooves, and diffusing the excess liquid crystals into the grooves for storage to prevent overflowing.

In specific implementation, since the thicknesses of the inorganic insulating layers, such as the gate insulating layer GI and the passivation layer PVX, etc., are generally thin, the depth of the closed through groove V formed in each inorganic insulating layer is also relatively small. Even if the stacked and overlapped closed through grooves V are formed as in FIG. 15, the depths of the closed grooves are only increased to 0.6 μm-1 μm. When the size of the display panel is small and the dripping precision of the liquid crystals is not sufficient, more liquid crystals will spread out of the outer side of the region where the frame sealing adhesive 4 is located, and then deeper grooves are required to store more liquid crystals. Therefore, in the above-mentioned display panel provided by the embodiments of the present disclosure, as shown in FIG. 16, the first substrate 1 includes: a base substrate 12, at least two inorganic insulating layers (e.g., the above-mentioned gate insulating layer GI and passivation layer PVX) sequentially disposed in a stacked manner on one side of the base substrate 12 facing the liquid crystals 3, and a second organic insulating layer 16 disposed between two adjacent inorganic insulating layers.

At least the second organic insulating layer 16 has a closed through groove V at a position where the closed groove (i.e., the blocking structure 11) is located. Specifically, a material of the second organic insulating layer 16 may be resin, and the thickness of the second organic insulating layer 16 is thick, generally between 2.5 μm and 4 μm, so that the depth of the closed groove (i.e., the blocking structure 11) may be up to 2.5 μm to 4 μm, thereby accommodating more liquid crystals.

In specific implementation, in the above-mentioned display panel provided by the embodiments of the present disclosure, the second organic insulating layer 16 may be used alone to form at least one closed through groove V, or inner and outer grooves may be formed by using the second organic insulating layer 16 and the passivation layer PVX or the second organic insulating layer 16 and the gate insulating layer GI, or the second organic insulating layer 16, the passivation layer PVX and the gate insulating layer GI may be used to form three circles of closed grooves from the inside out. The more the grooves, the greater the storage amount of the liquid crystals.

In specific implementation, in the above-mentioned display panel provided by the embodiments of the present disclosure, as shown in FIG. 16, at least one closed groove (i.e., the blocking structure 11) is provided (with one as an example), and the second organic insulating layer 16 has a closed through groove V corresponding to the closed groove (i.e., the blocking structure 11) in a one-to-one correspondence manner, so that the passivation layer PVX forms the corresponding closed groove (i.e., the blocking structure 11) at the position of the closed through groove V when the passivation layer PVX is formed.

In specific implementation, in the above-mentioned display panel provided by the embodiments of the present disclosure, at least two closed grooves (i.e., the blocking structures) are provided (with two as an example), one of the closed grooves is formed by providing the closed through groove in the second organic insulating layer, and the other closed groove is formed by providing the closed through groove in at least one of the at least two inorganic insulating layers (the passivation layer and the gate insulating layer). Specifically, one of the closed grooves is formed by providing the closed through groove in the second organic insulating layer, and the other closed groove is formed by providing the closed through groove in the passivation layer, i.e., the second organic insulating layer and the passivation layer are used to form two circles of closed grooves from the inside out, and the position of each closed through groove is not limited as long as the two closed through grooves are spaced in a sleeving manner between the frame sealing adhesive and the display region. Or, one of the closed grooves is formed by providing the closed through groove in the second organic insulating layer, and the other closed groove is formed by providing the closed through groove in the gate insulating layer, i.e., the second organic insulating layer and the gate insulating layer are used to form two circles of closed grooves from the inside out, and the position of each closed through groove is not limited as long as the two closed through grooves are spaced in a sleeving manner between the frame sealing adhesive and the display region.

In specific implementation, in the above-mentioned display panel provided by the embodiments of the present disclosure, the quantity of the closed grooves (i.e., the blocking structures) is the same as the sum of the quantities of the inorganic insulating layers (the passivation layer and the gate insulating layer) and the second organic insulating layer, i.e., the quantity of the closed grooves is three, and the second organic insulating layer and each inorganic insulating layer (the passivation layer and the gate insulating layer) each has a closed through groove corresponding to one of the closed grooves. That is, the second organic insulating layer, the passivation layer and the gate insulating layer are adopted to form three circles of closed grooves from the inside out, and the position of each closed through groove is not limited as long as the three closed through grooves are spaced in a sleeving manner between the frame sealing adhesive and the display region.

It should be noted that FIG. 13 to FIG. 20 provided by the embodiments of the present disclosure show several setting manners of the closed grooves (i.e., the blocking structures 11) listed in the present disclosure, which are not limited to this of course, and the closed grooves may be formed by providing at least one closed groove by using the GI, the PVX, or the second organic insulating layer alone, or inner and outer grooves are formed by combining every two layers, or three grooves from the inside out are formed by combining the three layers.

In specific implementation, in the above-mentioned display panel provided by the embodiments of the present disclosure, as shown in FIG. 19 and FIG. 20, at least two closed grooves (i.e., the blocking structures 11) are provided, each closed groove is formed by providing the closed through groove V in the same insulating layer, the spacing between the grooves needs to ensure that the grooves are not connected (two grooves are connected together to become a single groove), and the spacing between the two grooves on the same layer needs to be greater than an equipment tolerance, and the equipment tolerance of a through hole is generally 2.0 μm, so the distance between the two adjacent blocking structures 11 is greater than 2 μm.

As shown in FIG. 17 and FIG. 18, at least two closed grooves (i.e., the blocking structures 11) are provided, the closed grooves are formed by providing the closed through grooves V in different insulating layers, in addition to the equipment tolerance, an overlay tolerance of each insulating layer on a film layer where the gate G is located also needs to be taken into account, and a calculation formula is $\sqrt{1.5^2+1.5^2+(2/2)^2+(2/2)^2}$, where 1.5 is the overlay tolerance of each insulating layer on the film layer where the gate G is located, 2 is the equipment tolerance, divided by 2 means one side, and $\sqrt{1.5^2+1.5^2+(2/2)^2+(2/2)^2} \approx 2.2$ μm, so it is sufficient to set the spacing between two layers of grooves to be more than 5 μm, i.e., the distance between the two adjacent blocking structures 11 is greater than 5 μm.

In specific implementation, in the above-mentioned display panel provided by the embodiments of the present disclosure, as shown in FIG. 1 to FIG. 20, if the distance between the blocking structure 11 and the display region AA is too small, it will lead to the accumulation of PI (orientation layer, described subsequently) of the display region AA at the position of the blocking structure 11, resulting in the abnormal initial orientation of the liquid crystals, so in order to prevent the PI mura, the distance between the blocking structure 11 closest to the display region AA and the display region AA may be 100 μm to 300 μm. Optionally, if the distance between the blocking structure 11 and the frame sealing adhesive 4 is too small, it will lead to "climbing" of the frame sealing adhesive 4, i.e., when the frame sealing adhesive 4 is applied, the fluctuation of the frame sealing adhesive 4 to the top of the blocking structure 11 will result in high thickness and yellowing of the peripheral region BB of the display panel, so in order to prevent this phenomenon, the distance between the blocking structure 11 closest to the frame sealing adhesive 4 and the frame sealing adhesive 4 may be 200 μm to 250 μm.

In specific implementation, in the above-mentioned display panel provided by the embodiments of the present disclosure, as shown in FIG. 1 to FIG. 3, FIG. 5, and FIG. 7, a shape of the blocking structure 11 may be adjusted according to a shape of the display region AA, for example, if the shape of the display region AA in the embodiments of the present disclosure is a square, the shape of the blocking structure 11 is a square; for example, if the shape of the display region AA is a circle, the shape of the blocking structure 11 is a circle; for example, if the shape of the display region AA is a special shape, the shape of the blocking structure is a special shape.

In specific implementation, in the above-mentioned display panel provided by the embodiments of the present disclosure, as shown in FIG. 4, FIG. 6, and FIG. 8 to FIG. 10, a spacer (PS) that acts as a support is usually required in order to make a support exist between the first substrate 1 and the second substrate 2 after being aligned. Optionally, the spacer (PS) may be made on one side of the second substrate 2 facing the first substrate 1. The spacer (PS) generally includes a main spacer (Main PS, referred to as M PS) with a large height and a subsidiary spacer (Sub PS) with a small height. The main spacer (M PS) plays a role of a main support, i.e., the main spacer (M PS) is mainly configured to maintain a gap between the first substrate 1 and the second substrate 2; and the subsidiary spacer (Sub PS) plays a role of an auxiliary support, for example, the subsidiary spacer (Sub PS) is configured to enable a liquid crystal display apparatus to recover quickly after being subjected to external forces. During aligning, an end portion of the main spacer (M PS) away from the second substrate 2 is pressed against the first substrate 1 to maintain a certain aligning thickness. The main spacer (M PS) and the subsidiary spacer (Sub PS) may be provided in the display region AA, or of course, in a region of the peripheral region BB where the frame sealing adhesive 4 and the blocking structure 11 are not provided.

In specific implementation, in the above-mentioned display panel provided by the embodiments of the present disclosure, as shown in FIG. 4, FIG. 6, and FIG. 8 to FIG. 10, the display panel further includes: a first orientation layer (not shown) disposed on a side of the blocking structure 11 facing the liquid crystals 3 and corresponding to the display region AA, and a second orientation layer (not shown) disposed on a side of the spacer (PS) facing the liquid crystals 3 and corresponding to the display region AA, wherein materials of the first orientation layer and the second orientation layer may be polyimide (PI) materials.

It should be noted that the embodiments of the present disclosure are illustrated with the display panel being a liquid crystal display panel as an example, but the display panel provided by the embodiments of the present disclosure is not limited to the liquid crystal display panel, but may also be other display panels including a first substrate and a second substrate which are aligned, for example, an electrically wetted display panel or an electrophoretic display panel, etc.

It should be noted that thin film transistor liquid crystal displays are mainstream products in liquid crystal displays, especially small liquid crystal displays, and due to the limitation of the size, it is more difficult to avoid liquid crystals dripping to the outer side of the region where the frame sealing adhesive is located, resulting in a failure of aligning, and therefore, the display panel provided by the embodiments of the present disclosure is more suitable for the small thin film transistor liquid crystal displays.

In specific implementation, the above-mentioned display panel provided by the embodiments of the present disclosure may also include other functional structures known to those skilled in the art, which are not described in detail herein.

Figure 21:
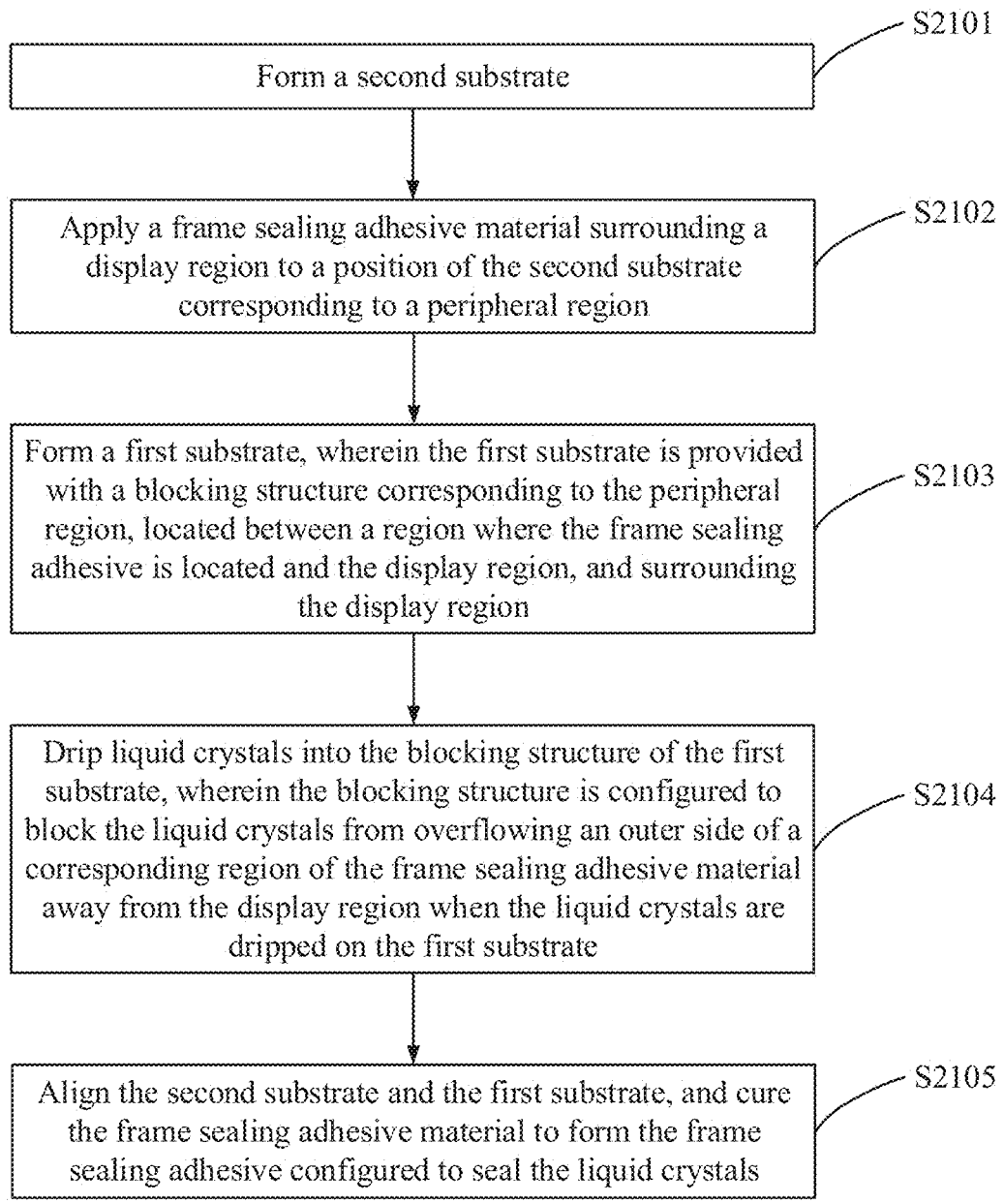
FIG. 21 is a schematic flow diagram of a manufacturing method for a display panel provided by an embodiment of the present disclosure.

Based on the same inventive concept, an embodiment of the present disclosure further provides a manufacturing method for a display panel, as shown in FIG. 21, including the following steps.

S2101, a second substrate is formed.

S2102, a frame sealing adhesive material surrounding a display region is applied to a position of the second substrate corresponding to a peripheral region.

S2103, a first substrate is formed, wherein the first substrate is provided with a blocking structure corresponding to the peripheral region, located between a region where the frame sealing adhesive is located and the display region, and surrounding the display region.

S2104, liquid crystals are dripped into the blocking structure of the first substrate, wherein the blocking structure is configured to block the liquid crystals from overflowing an outer side of a corresponding region of the frame sealing adhesive material away from the display region when the liquid crystals are dripped on the first substrate.

S2105, the second substrate and the first substrate are aligned, and the frame sealing adhesive material is cured to form the frame sealing adhesive configured to seal the liquid crystals.

In the above-mentioned manufacturing method for the display panel provided by the embodiment of the present disclosure, the peripheral region of the first substrate is provided with the blocking structure located between the region where the frame sealing adhesive is located and the display region and surrounding the display region, so that when the liquid crystals are dripped on the first substrate, the blocking structure prevents the liquid crystals from diffusing to the region where the frame sealing adhesive is located, and thereby prevents the liquid crystals from overflowing the outer side of the frame sealing adhesive away from the display region, i.e., prevents the liquid crystals from crossing over the region where the frame sealing adhesive is located. Therefore, the present disclosure can avoid the problem that the first substrate and the second substrate cannot be aligned successfully due to the fact that the liquid crystals diffuse to the outer side of the corresponding region of the frame sealing adhesive during the liquid crystal dripping.

The following is a detailed description of the manufacturing method for the display panel by using the display panel corresponding to the first substrate 1 shown in FIG. 11 as an example, and the specific steps are as follows.

Figure 22A:
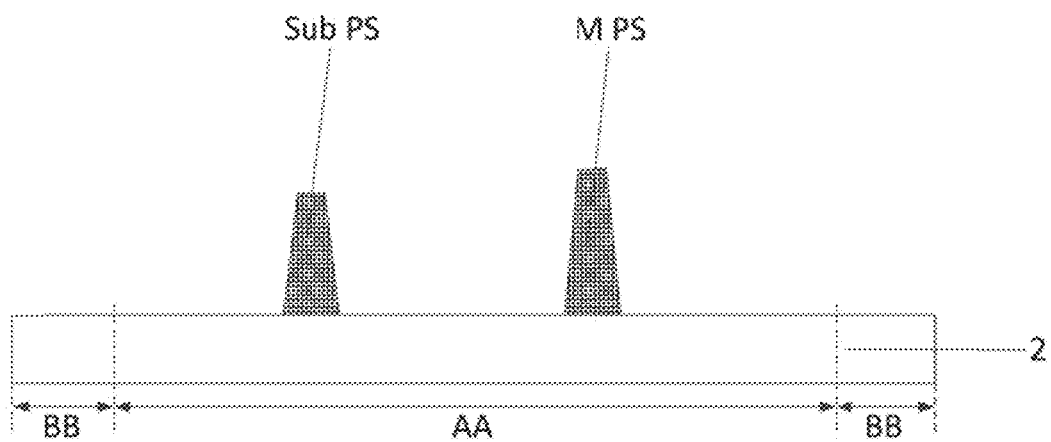
FIG. 22A-FIG. 22G are schematic structural diagrams after executing each step of a manufacturing method for a display panel provided by an embodiment of the present disclosure.

(1) The second substrate 2 is formed, and the second substrate 2 may include an underlayer and structures such as a color filter and a black matrix formed on one side of the underlayer; and then a main spacer (M PS) and a subsidiary spacer (Sub PS) are formed on the second substrate 2 corresponding to the display region AA, as shown in FIG. 22A.

Figure 22B:
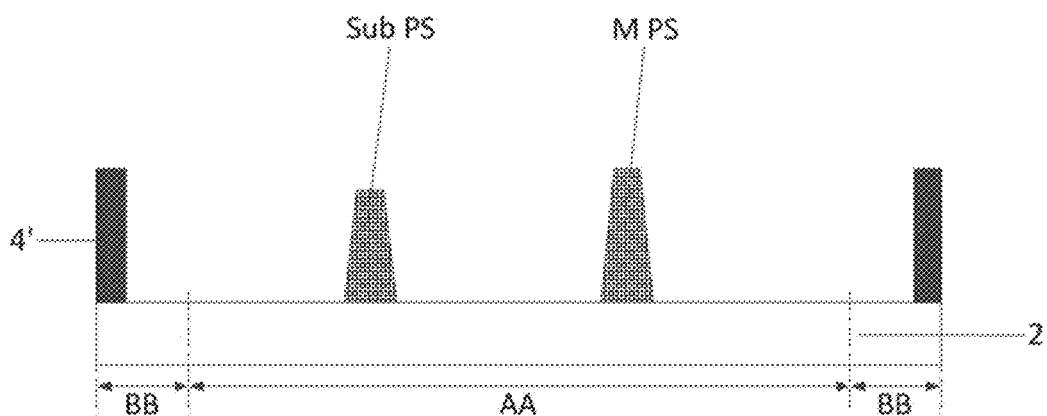

(2) A frame sealing adhesive material 4' surrounding the display region AA is applied to the position of the second substrate 2 corresponding to the peripheral region BB, as shown in FIG. 22B.

Figure 22C:
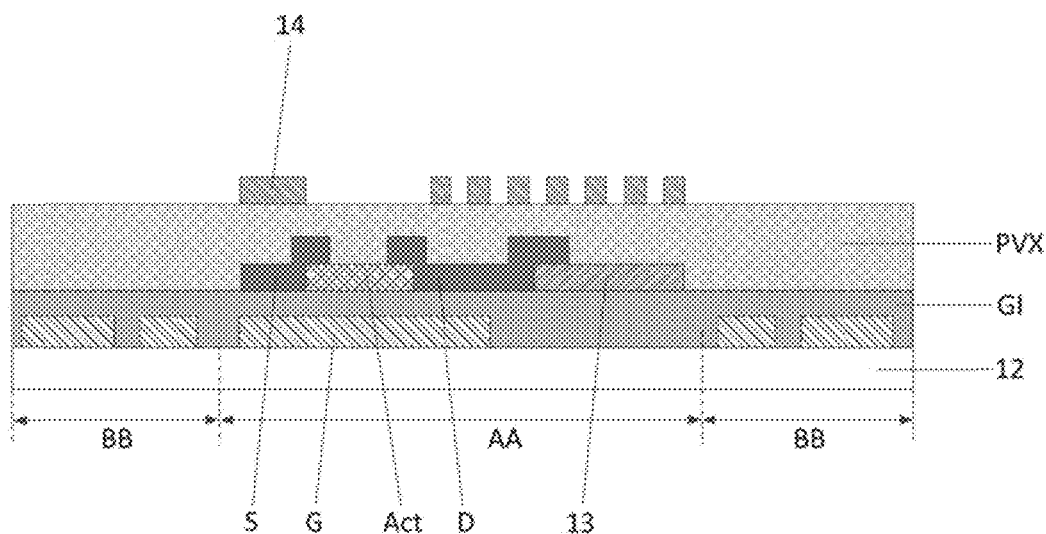

(3) A gate G, a gate insulating layer GI, an active layer Act, a pixel electrode 13, a source S, a drain D, a passivation layer PVX, and a common electrode 14 which are sequentially stacked are formed on a base substrate 12, as shown in FIG. 22C.

Figure 22D:
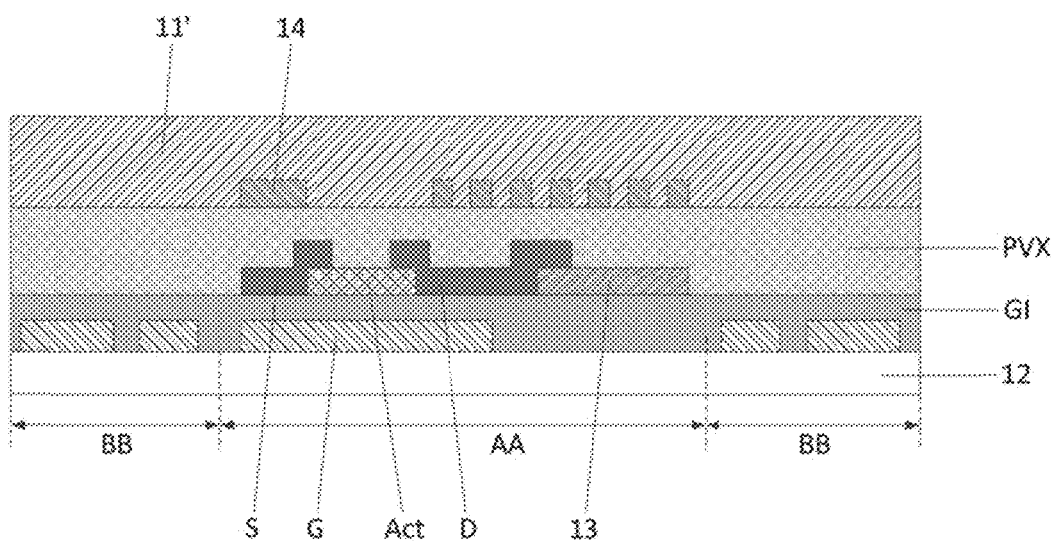

(4) A whole layer of resin material 11' is applied to the common electrode 14, as shown in FIG. 22D.

Figure 22E:
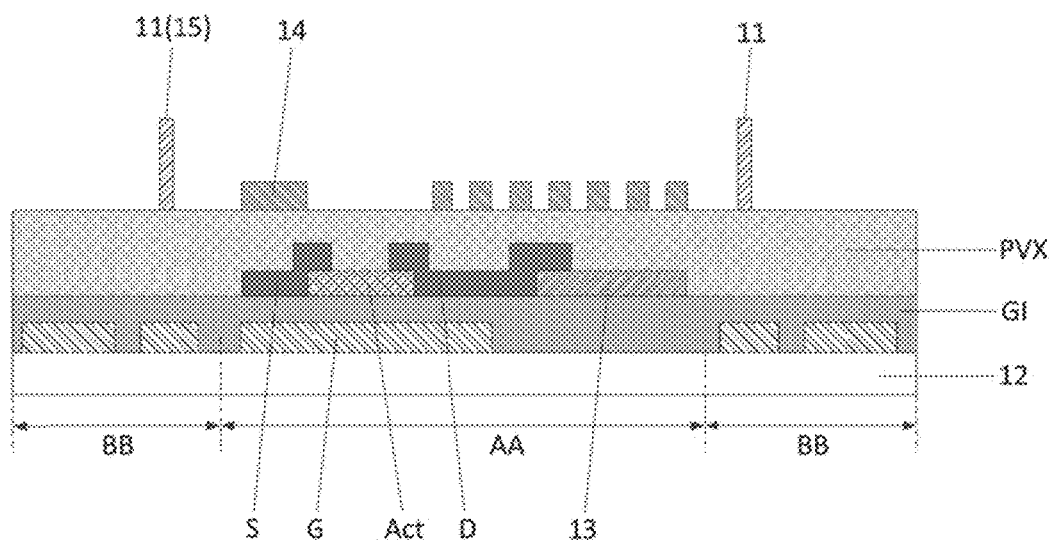

(5) The whole layer of resin material 11' is patterned by a photolithographic process to remove the resin material of the display region AA, so as to form a first organic insulating layer 15 located between the region where the frame sealing adhesive 4 is located and the display region AA on the peripheral region BB, the first organic insulating layer 15 is the blocking structure 11, so that the first substrate 1 is formed, as shown in FIG. 22E.

Figure 22F:
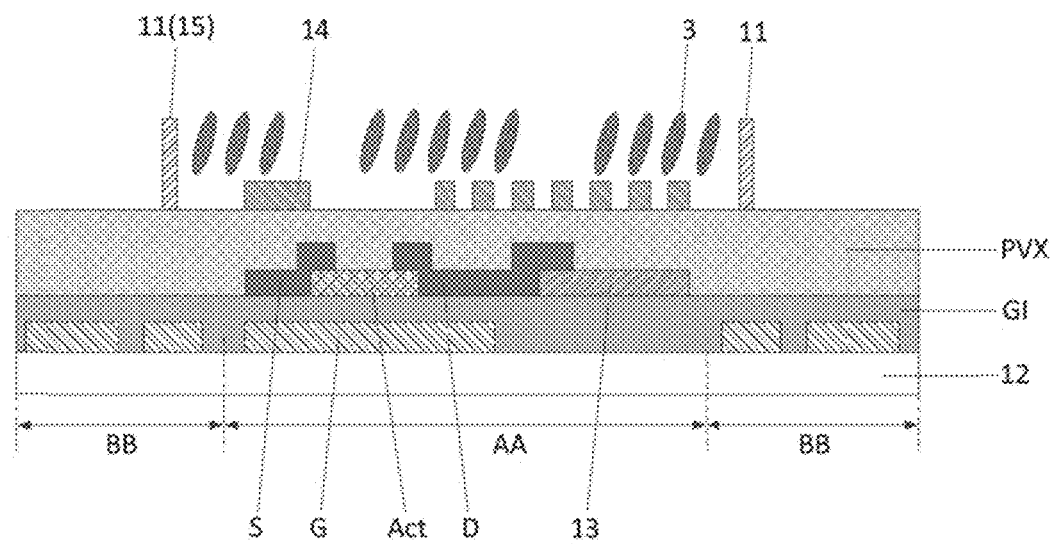

(6) The liquid crystals 3 are dripped into the blocking structure 11 of the first substrate 1, as shown in FIG. 22F.

Figure 22G:
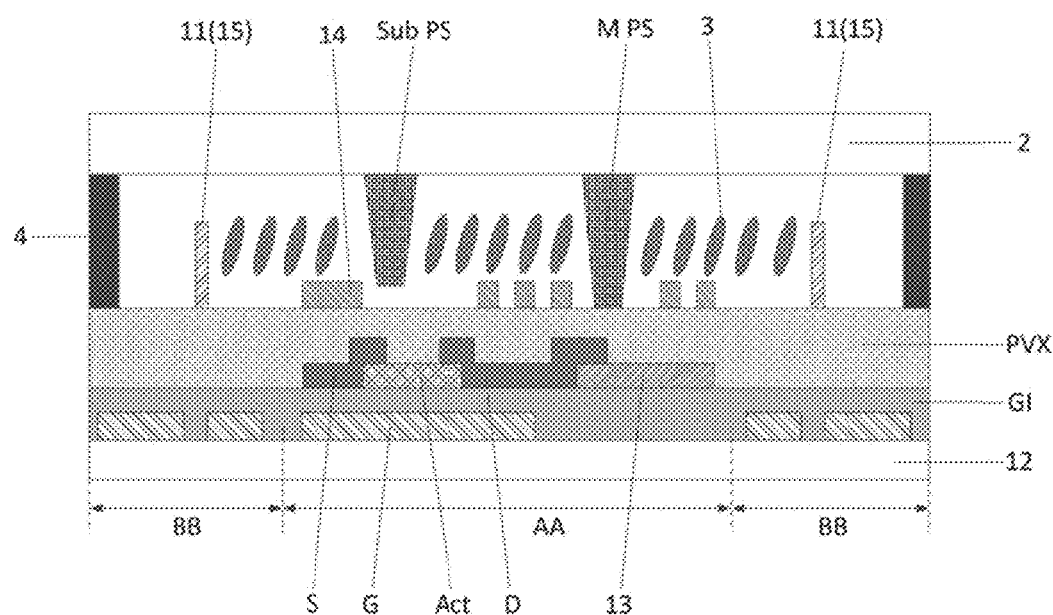

(7) Then, the second substrate 2 and the first substrate 1 are aligned, and the frame sealing adhesive material 4' is cured to form the frame sealing adhesive 4 configured to seal the liquid crystals 3, as shown in FIG. 22G.

It should be noted that the manufacturing method for the display panel corresponding to the first substrate 1 shown in FIG. 12-FIG. 20 is similar to the above-mentioned manufacturing method for the display panel corresponding to the first substrate 1 shown in the FIG. 11, differences are only in connection manners of the pixel electrode 13 and the drain D and different setting positions of the film layers of the blocking structure 11, and the manufacturing method may be referred to in detail in the above-mentioned manufacturing method for the display panel corresponding to the structure shown in the FIG. 11.

Based on the same inventive concept, an embodiment of the present disclosure further provides a display apparatus, including the display panel provided by the embodiments of the present disclosure. The principle for solving problems of the display apparatus is similar to that of the aforementioned display panel, and thus the implementation of the display apparatus can refer to the implementation of the aforementioned display panel, and repetitions are omitted here.

In specific implementation, the above-mentioned display apparatus provided by the embodiment of the present invention may be a liquid crystal display apparatus, and then the liquid crystal display apparatus also includes other functional structures, such as a backlight module.

In specific implementation, the above-mentioned display apparatus provided by the embodiment of the present invention may be a full-screen display apparatus, or may also be a flexible display apparatus, etc., which is not limited herein.

Figure 23:
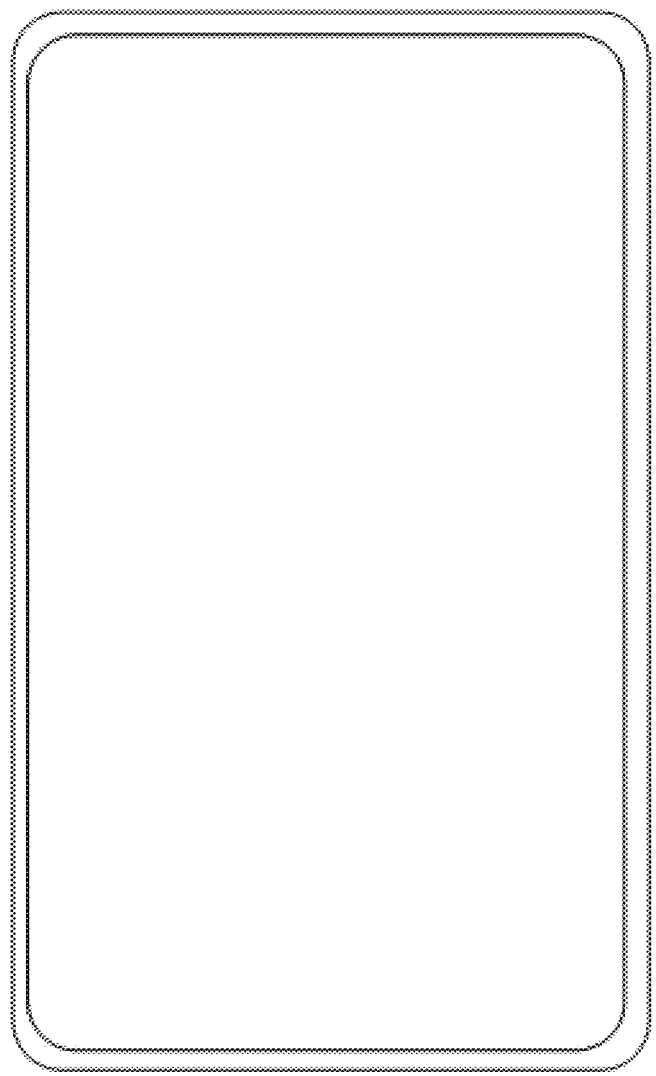
FIG. 23 is a schematic structural diagram of a display apparatus provided by an embodiment of the present disclosure.

In specific implementation, the above-mentioned display apparatus provided by the embodiment of the present invention may be a full-screen mobile phone shown in FIG. 23. Of course, the above-mentioned display apparatus provided by the embodiment of the present disclosure may be a tablet computer, a television, a display, a laptop, a digital photo frame, a navigator and any product or component with a display function. Other essential components of the display apparatus shall be understood by those of ordinary skill in the art, and is omitted herein and also shall not become a restriction to the present disclosure.

In the display panel, the manufacturing method for the display panel, and the display apparatus provided by the embodiments of the present disclosure, the peripheral region of the first substrate is provided with the blocking structure located between the frame sealing adhesive and the display region and surrounding the display region, so that when the liquid crystals are dripped on the first substrate, the blocking structure prevents the liquid crystals from diffusing to the region where the frame sealing adhesive is located, and thereby prevents the liquid crystals from overflowing the outer side of the frame sealing adhesive away from the display region, i.e., prevents the liquid crystals from crossing over the region where the frame sealing adhesive is located. Therefore, the present disclosure can avoid the problem that the first substrate and the second substrate cannot be aligned successfully due to the fact that the liquid crystals diffuse to the outer side of the corresponding region of the frame sealing adhesive during the liquid crystal dripping.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

It is apparent that those skilled in the art can make various modifications and variations on the embodiments of the present disclosure without departing from the spirit and scope of the embodiments of the present disclosure. Thus, provided that these modifications and variations of the embodiments of the present disclosure fall within the scope of the claims of the present disclosure and their equivalents, the present disclosure is also intended to cover such modifications and variations.

What is claimed is:

1. A display panel, comprising a first substrate and a second substrate which are aligned, wherein liquid crystals are filled between the first substrate and the second substrate, the first substrate and the second substrate which are aligned have a display region and a peripheral region surrounding the display region, the peripheral region is provided with a frame sealing adhesive located between the first substrate and the second substrate and surrounding the display region, and the frame sealing adhesive is configured to seal the liquid crystals; and the peripheral region of the first substrate is provided with a blocking structure located between a region where the frame sealing adhesive is located and the display region and surrounding the display region, and the blocking structure is configured to block the liquid crystals from overflowing an outer side of the frame sealing adhesive away from the display region when the liquid crystals are dripped on the first substrate;

wherein the blocking structure is a protruding structure where a surface of the first substrate corresponding to the peripheral region protrudes out of a surface corresponding to the display region; wherein the first substrate comprises a base substrate, and a plurality of film layers sequentially disposed in a stacked manner on one side of the base substrate facing the liquid crystals, wherein the peripheral region of the first substrate further comprises a first organic insulating layer disposed on one side of any one of the plurality of film layers facing the liquid crystals, the first organic insulating layer is an internal film layer of the protruding structure, and the first organic insulating layer causes the surface of the first substrate corresponding to the peripheral region to protrude out of the surface corresponding to the display region; or wherein the blocking structure is a closed groove where a surface of the first substrate corresponding to the peripheral region is concave into a surface corresponding to the display region; wherein the first substrate comprises a base substrate, and at least two inorganic insulating layers sequentially disposed in a stacked manner on one side of the base substrate facing the liquid crystals; and at least one of the at least two inorganic insulating layers has a closed through groove at a position where the closed groove is located.

2. The display panel according to claim 1, wherein one blocking structure is provided;

or, at least two blocking structures are provided, and the at least two blocking structures are spaced in a sleeving manner between the frame sealing adhesive and the display region.

3. The display panel according to claim 1, wherein the blocking structure is the protruding structure, the first organic insulating layer is a closed structure disposed surrounding the display region.

4. The display panel according to claim 1, wherein the blocking structure is the protruding structure, the first organic insulating layer is disposed surrounding the display region, the first organic insulating layer has long edges and short edges, and at least one opening disconnecting the first organic insulating layer is at least provided in the short edges.

5. The display panel according to claim 4, wherein a plurality of openings disconnecting the first organic insulating layer are provided in each edge of the first organic insulating layer.

6. The display panel according to claim 1, wherein the blocking structure is the closed groove, one closed groove is provided, and any one of the at least two inorganic insulating layers has a closed through groove at the position where the closed groove is located.

7. The display panel according to claim 1, wherein the blocking structure is the closed groove, one closed groove is provided, and each of the at least two inorganic insulating layers has a closed through groove at the position where the closed groove is located.

8. The display panel according to claim 1, wherein the blocking structure is the closed groove, at least two closed grooves are provided, and any one of the at least two inorganic insulating layers has closed through grooves corresponding to the closed grooves in a one-to-one correspondence manner.

9. The display panel according to claim 1, wherein the blocking structure is the closed groove, a quantity of closed grooves is the same as a quantity of the inorganic insulating layers, and each inorganic insulating layer has a closed through groove corresponding to one of the closed grooves.

10. The display panel according to claim 1, wherein the blocking structure is the closed groove, the first substrate comprises a base substrate, at least two inorganic insulating layers sequentially disposed in a stacked manner between the base substrate and the liquid crystals, and a second organic insulating layer disposed between two adjacent inorganic insulating layers; and at least the second organic insulating layer has a closed through groove at a position where the closed groove is located.

11. The display panel according to claim 10, wherein at least one closed groove is provided, and the second organic insulating layer has a closed through groove corresponding to the closed groove in a one-to-one correspondence manner.

12. The display panel according to claim 10, wherein at least two closed grooves are provided, one of the closed grooves is formed by providing the closed through groove in the second organic insulating layer, and other closed grooves are formed by providing closed through grooves in at least one of the at least two inorganic insulating layers.

13. The display panel according to claim 10, wherein a quantity of closed grooves is the same as a sum of quantities of the inorganic insulating layers and the second organic insulating layer, and the second organic insulating layer and each inorganic insulating layer respectively have a closed through groove corresponding to one of the closed grooves.

14. The display panel according to claim 1, wherein the blocking structure is the closed groove, at least two closed grooves are provided, each closed groove is formed by providing the closed through groove in the same insulating layer, and a distance between two adjacent blocking structures is greater than 2 µm; and at least two closed grooves are provided, each closed groove is formed by providing the closed through grooves in different insulating layers, and a distance between two adjacent blocking structures is greater than 5 µm;

wherein a distance between the blocking structure closest to the display region and the display region is 100 µm-300 µm, and a distance between the blocking structure closest to the frame sealing adhesive and the frame sealing adhesive is 200 µm-250 µm;

wherein the first substrate is an array substrate, and the second substrate is an opposite substrate.

15. A display apparatus, comprising a display panel, wherein the display panel comprises a first substrate and a second substrate which are aligned, wherein liquid crystals are filled between the first substrate and the second substrate, the first substrate and the second substrate which are aligned have a display region and a peripheral region surrounding the display region, the peripheral region is provided with a frame sealing adhesive located between the first substrate and the second substrate and surrounding the display region, and the frame sealing adhesive is configured to seal the liquid crystals; and the peripheral region of the first substrate is provided with a blocking structure located between a region where the frame sealing adhesive is located and the display region and surrounding the display region, and the blocking structure is configured to block the liquid crystals from overflowing an outer side of the frame sealing adhesive away from the display region when the liquid crystals are dripped on the first substrate;

wherein the blocking structure is a protruding structure where a surface of the first substrate corresponding to the peripheral region protrudes out of a surface corresponding to the display region; wherein the first substrate comprises a base substrate, and a plurality of film layers sequentially disposed in a stacked manner on one side of the base substrate facing the liquid crystals, wherein the peripheral region of the first substrate further comprises a first organic insulating layer disposed on one side of any one of the plurality of film layers facing the liquid crystals, the first organic insulating layer is an internal film layer of the protruding structure, and the first organic insulating layer causes the surface of the first substrate corresponding to the peripheral region to protrude out of the surface corresponding to the display region; or wherein the blocking structure is a closed groove where a surface of the first substrate corresponding to the peripheral region is concave into a surface corresponding to the display region; wherein the first substrate comprises a base substrate, and at least two inorganic insulating layers sequentially disposed in a stacked manner on one side of the base substrate facing the liquid crystals; and at least one of the at least two inorganic insulating layers has a closed through groove at a position where the closed groove is located.

16. A manufacturing method for a display panel, comprising:

forming a second substrate;

applying a frame sealing adhesive material surrounding a display region to a position of the second substrate corresponding to a peripheral region;

forming a first substrate, wherein, corresponding to the peripheral region, the first substrate is provided with a blocking structure located between a region where a frame sealing adhesive is located and the display region, and surrounding the display region;

dripping liquid crystals into the blocking structure of the first substrate, wherein the blocking structure is configured to block the liquid crystals from overflowing an outer side of a corresponding region of the frame sealing adhesive material away from the display region when the liquid crystals are dripped on the first substrate; and aligning the second substrate and the first substrate, and curing the frame sealing adhesive material to form the frame sealing adhesive configured to seal the liquid crystals;

wherein the blocking structure is a protruding structure where a surface of the first substrate corresponding to the peripheral region protrudes out of a surface corresponding to the display region; wherein the first substrate comprises a base substrate, and a plurality of film layers sequentially disposed in a stacked manner on one side of the base substrate facing the liquid crystals, wherein the peripheral region of the first substrate further comprises a first organic insulating layer disposed on one side of any one of the plurality of film layers facing the liquid crystals, the first organic insulating layer is an internal film layer of the protruding structure, and the first organic insulating layer causes the surface of the first substrate corresponding to the peripheral region to protrude out of the surface corresponding to the display region; or wherein the blocking structure is a closed groove where a surface of the first substrate corresponding to the peripheral region is concave into a surface corresponding to the display region; wherein the first substrate comprises a base substrate, and at least two inorganic insulating layers sequentially disposed in a stacked manner on one side of the base substrate facing the liquid crystals; and at least one of the at least two inorganic insulating layers has a closed through groove at a position where the closed groove is located.

* * * * *